US011943715B2

(12) United States Patent
Abdelghaffar et al.

(10) Patent No.: US 11,943,715 B2
(45) Date of Patent: Mar. 26, 2024

(54) TECHNIQUES FOR CONFIGURING USE OF AN ENERGY SAVING MODE

(71) Applicant: QUALCOMM Incorporated, San Diego, CA (US)

(72) Inventors: Muhammad Sayed Khairy Abdelghaffar, San Jose, CA (US); Wanshi Chen, San Diego, CA (US); Peter Gaal, San Diego, CA (US); Gokul Sridharan, Sunnyvale, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/529,847

(22) Filed: Nov. 18, 2021

(65) Prior Publication Data

US 2023/0156601 A1 May 18, 2023

(51) Int. Cl.
*H04W 52/02* (2009.01)
*H04L 5/00* (2006.01)
*H04W 24/10* (2009.01)

(52) U.S. Cl.
CPC ....... *H04W 52/0235* (2013.01); *H04L 5/0051* (2013.01); *H04W 24/10* (2013.01); *H04W 52/0258* (2013.01)

(58) Field of Classification Search
CPC .............. H04L 5/0053; H04L 5/0057; H04W 52/0209; H04W 52/0212; H04W 52/0216; H04W 52/0229; H04W 52/0235; H04W 52/0258; Y02D 30/70
See application file for complete search history.

(56) References Cited

U.S. PATENT DOCUMENTS

| | | | | |
|---|---|---|---|---|
| 2020/0029274 A1* | 1/2020 | Cheng | ............... | H04W 52/0216 |
| 2020/0145062 A1* | 5/2020 | Jung | ................. | H04W 52/0216 |
| 2020/0322887 A1* | 10/2020 | Pao | .................... | H04W 52/0245 |
| 2021/0028843 A1 | 1/2021 | Zhou et al. | | |
| 2022/0201605 A1* | 6/2022 | Yang | ................. | H04W 52/0216 |
| 2022/0239352 A1* | 7/2022 | Hakola | ................. | H04L 5/0091 |

OTHER PUBLICATIONS

International Search Report and Written Opinion—PCT/US2022/045884—ISA/EPO—dated Jan. 26, 2023 (2108141WO).

* cited by examiner

*Primary Examiner* — Pao Sinkantarakorn
(74) *Attorney, Agent, or Firm* — Holland & Hart LLP/Qualcomm Incorporated

(57) ABSTRACT

Methods, systems, and devices for wireless communications are described. A user equipment (UE) may receive, from a wireless network device (e.g., a base station or a transmission reception point (TRP) of the base station), a first control message comprising an indication of a set of energy saving modes of the wireless network device. The UE may receive a second control message indicating a first energy saving mode from the set of energy saving modes, where the first energy saving mode may be indicative of a number of channel state information (CSI) reference signal (CSI-RS) resources used by the wireless network device. The UE may monitor one or more of the CSI-RS resources for a CSI-RS in accordance with the first energy saving mode, and transmit, to the wireless network device, CSI feedback determined based on measurements made by the UE of the CSI-RS.

28 Claims, 16 Drawing Sheets

TECHNIQUES FOR CONFIGURING USE OF AN ENERGY SAVING MODE

FIELD OF TECHNOLOGY

The following relates to wireless communications, including techniques for configuring use of an energy saving mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a network device such as a base station, a transmission reception point (TRP), or some other wireless device may transmit one or more channel state information (CSI) reference signals (CSI-RSs) to a UE for the purpose of channel sounding. A UE may receive one or more CSI-RSs and measure one or more characteristics of a channel over which the CSI-RS was transmitted. In some cases, the UE may be configured to transmit, to the network device, a feedback report associated with the one or more received CSI-RSs. Techniques for performing such a CSI procedure by a network device, a UE, or both may be improved.

SUMMARY

The described techniques relate to improved methods, systems, devices, and apparatuses that support techniques for configuring use of an energy saving mode. Generally, the described techniques provide for improved methods of configuring energy saving modes associated with performing channel state information (CSI) reference signal (CSI-RS) procedures. A wireless network device (e.g., a base station or a transmission reception point (TRP) of a base station) may determine or be configured with a set of energy saving modes, where each energy saving mode may impact how the wireless network device transmits CSI-RSs. For example, each energy saving mode may be associated with a different number of CSI-RS resources, CSI-RS ports, antenna panels, antenna sub-panels, or a combination thereof. Accordingly, the wireless network device may transmit an indication of the set of energy saving modes to a user equipment (UE) configured to receive one or more CSI-RSs from the base station. The UE may then receive a second message indicating a first energy saving mode from the set of energy saving modes, where the first energy saving mode may be indicative of a number of CSI-RS resources used by the wireless network device to transmit one or more CSI-RSs. The UE may monitor the CSI-RS resources for a CSI-RS in accordance with the first energy saving mode, and transmit, to the wireless network device, CSI feedback determined based on measurements made by the UE of the CSI-RS. For example, the format of the CSI feedback message may be based on the indicated energy saving mode.

A method for wireless communications at a UE is described. The method may include receiving, from a wireless network device, a first control message including an indication of a set of energy saving modes of the wireless network device, receiving a second control message indicating a first energy saving mode from the set of energy saving modes, the first energy saving mode indicative of a number of channel state information reference signal resources to be used by the wireless network device, monitoring one or more of the channel state information reference signal resources for a channel state information reference signal in accordance with the first energy saving mode, and transmitting, to the wireless network device, channel state information feedback determined based on measurements made by the UE of the channel state information reference signal.

An apparatus for wireless communications is described. The apparatus may include a processor, memory coupled with the processor, and instructions stored in the memory. The instructions may be executable by the processor to cause the apparatus to receive, from a wireless network device, a first control message including an indication of a set of energy saving modes of the wireless network device, receive a second control message indicating a first energy saving mode from the set of energy saving modes, the first energy saving mode indicative of a number of channel state information reference signal resources to be used by the wireless network device, monitor one or more of the channel state information reference signal resources for a channel state information reference signal in accordance with the first energy saving mode, and transmit, to the wireless network device, channel state information feedback determined based on measurements made by the UE of the channel state information reference signal.

Another apparatus for wireless communications is described. The apparatus may include means for receiving, from a wireless network device, a first control message including an indication of a set of energy saving modes of the wireless network device, means for receiving a second control message indicating a first energy saving mode from the set of energy saving modes, the first energy saving mode indicative of a number of channel state information reference signal resources to be used by the wireless network device, means for monitoring one or more of the channel state information reference signal resources for a channel state information reference signal in accordance with the first energy saving mode, and means for transmitting, to the wireless network device, channel state information feedback determined based on measurements made by the UE of the channel state information reference signal.

A non-transitory computer-readable medium storing code for wireless communications is described. The code may include instructions executable by a processor to receive, from a wireless network device, a first control message including an indication of a set of energy saving modes of the wireless network device, receive a second control message indicating a first energy saving mode from the set of energy saving modes, the first energy saving mode indicative of a number of channel state information reference signal resources to be used by the wireless network device, monitor one or more of the channel state information reference signal resources for a channel state information reference signal in accordance with the first energy saving mode, and transmit, to the wireless network device, channel state information feedback determined based on measurements made by the UE of the channel state information reference signal.

Some examples of the method, apparatuses, and non-transitory computer-readable medium described herein may further include operations, features, means, or instructions for transmitting, to the wireless network device, a signal including UE assisted information, the UE assisted information indicative of communication traffic at the UE, a number of antenna panels, a number of channel state information reference signal ports, or a combination thereof, where the first energy saving mode may be based on the UE assisted information.

In some examples of the method, apparatuses, and non-transitory computer-readable medium described herein, receiving the set of energy saving modes may include operations, features, means, or instructions for receiving an indication of a number of channel state information reference signal ports allocated per channel state information reference signal resource associated with each energy saving mode of the set of energy saving modes.

Some examples of the method, apparatuses, and non-transitory computer-readable medium described herein may further include operations, features, means, or instructions for receiving a message identifying a set of channel state information reference signal ports that may be activated during the first energy saving mode.

In some examples of the method, apparatuses, and non-transitory computer-readable medium described herein, receiving the set of energy saving modes may include operations, features, means, or instructions for receiving an indication of a number of antenna panels of the wireless network device, a number of antenna sub-panels of the wireless network device, or both associated with each energy saving mode of the set of energy saving modes.

Some examples of the method, apparatuses, and non-transitory computer-readable medium described herein may further include operations, features, means, or instructions for receiving a message identifying a set of antenna panels, a set of antenna sub-panels, or both that may be activated during the first energy saving mode.

In some examples of the method, apparatuses, and non-transitory computer-readable medium described herein, the message includes an indication of a mapping of a set of channel state information reference signal ports corresponding with each antenna panel of the set of antenna panels, with each antenna sub-panel from the set of antenna sub-panels, or a combination thereof.

Some examples of the method, apparatuses, and non-transitory computer-readable medium described herein may further include operations, features, means, or instructions for monitoring, prior to receiving the second control message, a set of channel state information reference signal resources for the channel state information reference signal in accordance with a default energy saving mode and transmitting, to the wireless network device, channel state information feedback determined based on measurements made by the UE of the channel state information reference signal in accordance with the default energy saving mode.

In some examples of the method, apparatuses, and non-transitory computer-readable medium described herein, receiving the first control message may include operations, features, means, or instructions for receiving a radio resource control message including the indication of the set of energy saving modes of the wireless network device.

In some examples of the method, apparatuses, and non-transitory computer-readable medium described herein, the first control message indicates that the set of energy saving modes may be applicable to uplink communications only, downlink communications only, or both.

In some examples of the method, apparatuses, and non-transitory computer-readable medium described herein, receiving the second control message may include operations, features, means, or instructions for receiving a broadcasted message, a UE-specific message, or a group-common message indicating the first energy saving mode from the set of energy saving modes.

In some examples of the method, apparatuses, and non-transitory computer-readable medium described herein, receiving the second control message may include operations, features, means, or instructions for receiving a radio resource control reconfiguration message indicating the first energy saving mode based on a duration between a previous energy saving mode and the first energy saving mode.

In some examples of the method, apparatuses, and non-transitory computer-readable medium described herein, the second control message indicating the first energy saving mode may be received based on a synchronization signal block configuration.

In some examples of the method, apparatuses, and non-transitory computer-readable medium described herein, receiving the second control message may include operations, features, means, or instructions for receiving a system information block, a medium access control (MAC) control element message, or downlink control information message, or a combination thereof indicating the first energy saving mode from the set of energy saving modes.

In some examples of the method, apparatuses, and non-transitory computer-readable medium described herein, the wireless network device may be a base station, or a transmission reception point of the base station.

A method for wireless communications at a wireless network device is described. The method may include transmitting, to a UE, a first control message including an indication of a set of energy saving modes of the wireless network device, transmitting a second control message indicating a first energy saving mode from the set of energy saving modes, the first energy saving mode indicative of a number of channel state information reference signal resources to be used by the wireless network device, transmitting one or more channel state information reference signals in accordance with the first energy saving mode, and receiving, from the UE, channel state information feedback determined based on measurements made by the UE of the one or more channel state information reference signals.

An apparatus for wireless communications is described. The apparatus may include a processor, memory coupled with the processor, and instructions stored in the memory. The instructions may be executable by the processor to cause the apparatus to transmit, to a UE, a first control message including an indication of a set of energy saving modes of a wireless network device, transmit a second control message indicating a first energy saving mode from the set of energy saving modes, the first energy saving mode indicative of a number of channel state information reference signal resources to be used by the wireless network device, transmit one or more channel state information reference signals in accordance with the first energy saving mode, and receive, from the UE, channel state information feedback determined based on measurements made by the UE of the one or more channel state information reference signals.

Another apparatus for wireless communications is described. The apparatus may include means for transmitting, to a UE, a first control message including an indication of a set of energy saving modes of a wireless network device, means for transmitting a second control message indicating a first energy saving mode from the set of energy saving modes, the first energy saving mode indicative of a number of channel state information reference signal resources to be used by the wireless network device, means for transmitting one or more channel state information reference signals in accordance with the first energy saving mode, and means for receiving, from the UE, channel state information feedback determined based on measurements made by the UE of the one or more channel state information reference signals.

A non-transitory computer-readable medium storing code for wireless communications is described. The code may include instructions executable by a processor to transmit, to a UE, a first control message including an indication of a set of energy saving modes of a wireless network device, transmit a second control message indicating a first energy saving mode from the set of energy saving modes, the first energy saving mode indicative of a number of channel state information reference signal resources to be used by the wireless network device, transmit one or more channel state information reference signals in accordance with the first energy saving mode, and receive, from the UE, channel state information feedback determined based on measurements made by the UE of the one or more channel state information reference signals.

Some examples of the method, apparatuses, and non-transitory computer-readable medium described herein may further include operations, features, means, or instructions for receiving, from at least the UE, a signal including UE assisted information, the UE assisted information indicative of communication traffic at the UE, a number of antenna panels, a number of channel state information reference signal ports, or a combination thereof and determining to switch energy saving modes based on the UE assisted information from at least the UE.

Some examples of the method, apparatuses, and non-transitory computer-readable medium described herein may further include operations, features, means, or instructions for deactivating one or more channel state information reference signals ports, one or more antenna panels, one or more antenna sub-panels, or a combination thereof based on the first energy saving mode.

In some examples of the method, apparatuses, and non-transitory computer-readable medium described herein, transmitting the set of energy saving modes may include operations, features, means, or instructions for transmitting an indication of a number of channel state information reference signal ports allocated per channel state information reference signal resource associated with each energy saving mode of the set of energy saving modes.

Some examples of the method, apparatuses, and non-transitory computer-readable medium described herein may further include operations, features, means, or instructions for transmitting a message identifying a set of channel state information reference signal ports that may be activated during the first energy saving mode.

In some examples of the method, apparatuses, and non-transitory computer-readable medium described herein, the channel state information reference signal ports may be configured into one or more groups.

In some examples of the method, apparatuses, and non-transitory computer-readable medium described herein, transmitting the set of energy saving modes may include operations, features, means, or instructions for transmitting an indication of a number of antenna panels, a number of antenna sub-panels, or both associated with each energy saving mode of the set of energy saving modes.

Some examples of the method, apparatuses, and non-transitory computer-readable medium described herein may further include operations, features, means, or instructions for transmitting a message identifying a set of antenna panels, a set of antenna sub-panels, or both that may be activated during the first energy saving mode.

In some examples of the method, apparatuses, and non-transitory computer-readable medium described herein, the message includes an indication of a mapping of a set of channel state information reference signal ports corresponding with each antenna panel of the set of antenna panels, with each antenna sub-panel from the set of antenna sub-panels, or a combination thereof.

Some examples of the method, apparatuses, and non-transitory computer-readable medium described herein may further include operations, features, means, or instructions for transmitting, one or more channel state information references signals via a set of resources in accordance with a default energy saving mode and receiving, from the UE, channel state information feedback determined based on measurements made by the UE of the one or more channel state information reference signals in accordance with the default energy saving mode.

Some examples of the method, apparatuses, and non-transitory computer-readable medium described herein may further include operations, features, means, or instructions for determining to switch to the first energy saving mode from the default energy saving mode, where transmitting the second control message may be based on the determination.

In some examples of the method, apparatuses, and non-transitory computer-readable medium described herein, transmitting the first control message may include operations, features, means, or instructions for transmitting a radio resource control message including the indication of the set of energy saving modes of the wireless network device.

In some examples of the method, apparatuses, and non-transitory computer-readable medium described herein, the first control message indicates that the set of energy saving modes may be applicable to uplink communications, downlink communications, or both.

In some examples of the method, apparatuses, and non-transitory computer-readable medium described herein, transmitting the second control message may include operations, features, means, or instructions for transmitting a broadcasted message, a UE-specific message, or a group-common message indicating the first energy saving mode from the set of energy saving modes.

In some examples of the method, apparatuses, and non-transitory computer-readable medium described herein, transmitting the second control message may include operations, features, means, or instructions for transmitting a radio resource control reconfiguration message indicating the first energy saving mode based on a duration between a previous energy saving mode and the first energy saving mode.

In some examples of the method, apparatuses, and non-transitory computer-readable medium described herein, the second control message indicating the first energy saving mode may be received based on a synchronization signal block configuration.

In some examples of the method, apparatuses, and non-transitory computer-readable medium described herein, transmitting the second control message may include operations, features, means, or instructions for transmitting a system information block, a medium access control (MAC) control element message, or downlink control information message, or a combination thereof indicating the first energy saving mode from the set of energy saving modes.

In some examples of the method, apparatuses, and non-transitory computer-readable medium described herein, the wireless network device may be a base station, or a transmission reception point of the base station.

DETAILED DESCRIPTION

Figure 1:
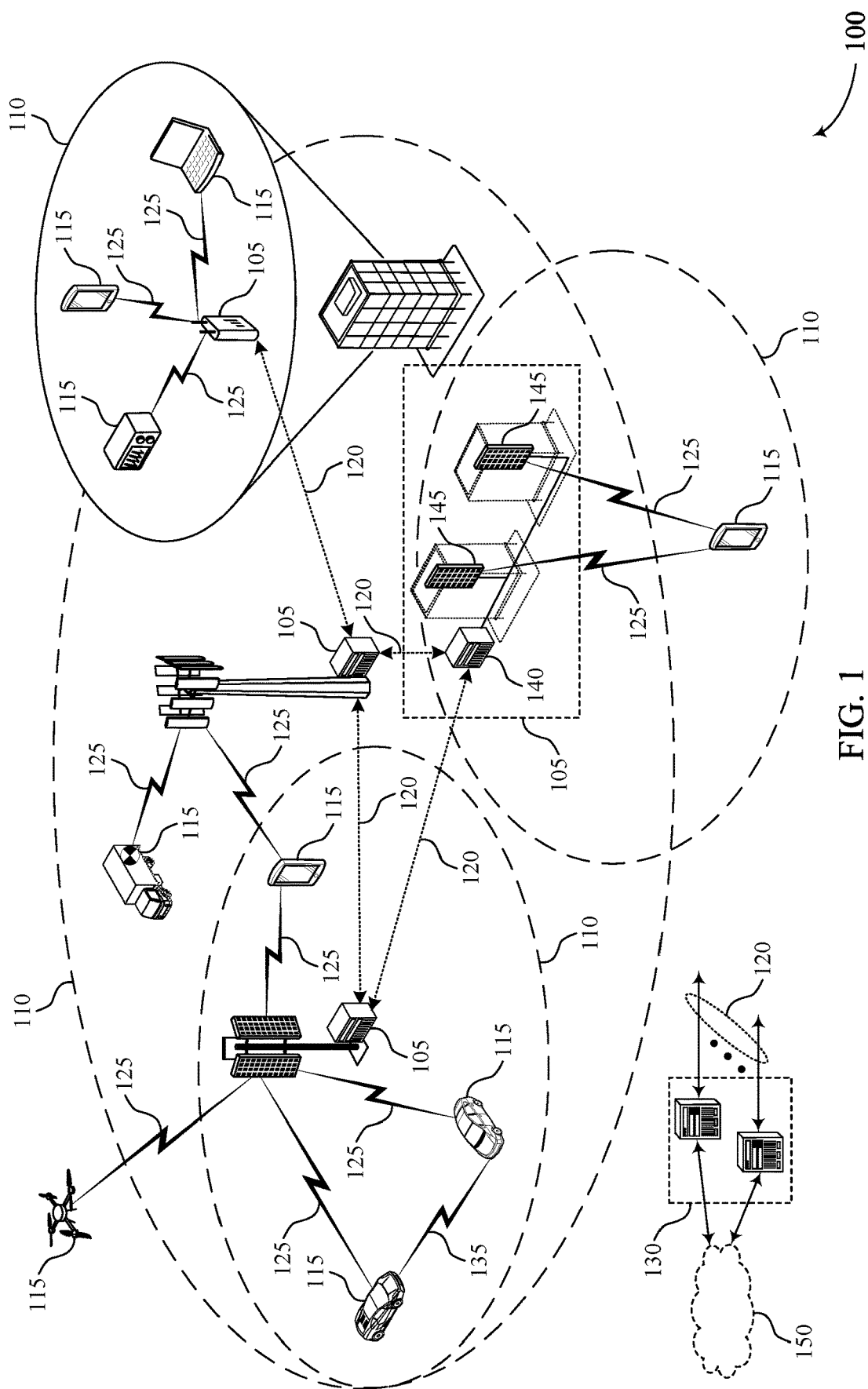
FIG. 1 illustrates an example of a wireless communications system that supports techniques for configuring use of an energy saving mode in accordance with aspects of the present disclosure.

In some wireless communications systems, a network device such as a base station, a transmission reception point (TRP), or some other network device may transmit one or more channel state information (CSI) reference signals (CSI-RSs) to a user equipment (UE) for the purpose of channel sounding. A UE may receive one or more CSI-RSs and measure one or more characteristics of a channel over which the CSI-RS was transmitted. The UE may be configured to transmit, to the network device, a feedback report (e.g., a CSI report, a channel state feedback (CSF) report) associated with the one or more received CSI-RSs. In some cases, the UE may receive an indication of a configuration for transmitting the feedback report. For example, the UE may receive an indication of one or more CSI-RS resources to monitor for, and/or a type of CSI measurements to perform on received CSI-RSs. Accordingly, the feedback report may be based on the indicated configuration.

In recent years there has been a growing concern over the power consumed by cellular networks due to environmental factors such as carbon emissions. As a result, network energy efficiency becomes increasingly important. Accordingly, in some cases, a wireless network device may turn off one or more antenna panels (or sub-panels) so as to reduce energy consumption. For example, a wireless network device may switch from a full-duplex mode to a half-duplex mode, such as when the wireless network device detects low traffic and/or activity in the cell. In some implementations, a wireless network device may dynamically adapt an antenna configuration in accordance with an energy saving mode and may signal such adaptation to one or more UEs. By signaling such adaption to the one or more UEs, the one or more UEs may determine how to receive signals from the wireless network device and/or how to transmit feedback to the wireless network device. In some cases, such energy saving procedure may impact a CSI procedure. For example, by dynamically de-activating (e.g., turning off) one or more antenna panels, the wireless network device may reduce a number of CSI-RS resources and/or a number of CSI-RS ports over which the wireless network device may transmit CSI-RSs, which may impact a UEs reception of such CSI-RSs and/or a UEs configuration of a CSI feedback report. As such, a wireless network device may transmit an indication of an energy saving mode the wireless network device is using and an indication of the energy saving mode may impact a CSI procedure.

For example, a wireless network device may be configured with a set of energy saving modes where each mode may be associated with a number of CSI-RS ports per CSI-RS resource, a number of CSI-RS resources, a number of antenna panels (or subpanels) being used by the wireless network device, or a combination thereof. The wireless network device may signal to a UE the set of energy saving modes. Then, a wireless network device may switch to one of the energy saving modes from the set (where the wireless network device may reduce a number of CSI-RS ports, reduce a number of CSI-RS resources, reduce number of panels or sub-panels) and indicate, to the UE, the energy saving mode the base station switched to. Accordingly, the UE may monitor for CSI-RSs in the appropriate resources and provide channel state information feedback in accordance with the energy saving mode.

Particular aspects of the subject matter described herein may be implemented to realize one or more advantages. The described techniques may support improvements in CSI measurement and reporting by improving reliability, improving coordination between network device, and decreasing energy consumption, among other advantages. As such, supported techniques may include improved network operations and, in some examples, may promote network efficiencies, among other benefits.

Aspects of the disclosure are initially described in the context of wireless communications systems. Aspects are then described with reference to energy saving mode configurations, and a process flow. Aspects of the disclosure are further illustrated by and described with reference to apparatus diagrams, system diagrams, and flowcharts that relate to techniques for configuring use of an energy saving mode.

FIG. 1 illustrates an example of a wireless communications system 100 that supports techniques for configuring use of an energy saving mode in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications system 100, a base station 105 (or a transmission reception point (TRP) of a base station 105) may determine or be configured with a set of energy saving modes, where each energy saving mode may impact how the base station 105 transmits CSI-RSs. For example, each energy saving mode may be associated with a different number of CSI-RS resources, CSI-RS ports, antenna panels, antenna sub-panels, or a combination thereof. Accordingly, the base station 105 may transmit an indication of the set of energy saving modes to a UE 115 configured to receive one or more CSI-RSs from the base station 105. The UE 115 may then receive a second message indicating a first energy saving mode from the set of energy saving modes, where the first energy saving mode may be indicative of a number of CSI-RS resources used by the base station 105 or TRP. The UE 115 may monitor one or more of the CSI-RS resources for a CSI-RS in accordance with the first energy saving mode, and transmit, to the base station 105, CSI feedback determined based on measurements made by the UE 115 of the CSI-RS. For example, the format of the CSI feedback message may be based on the indicated energy saving mode.

Figure 2:
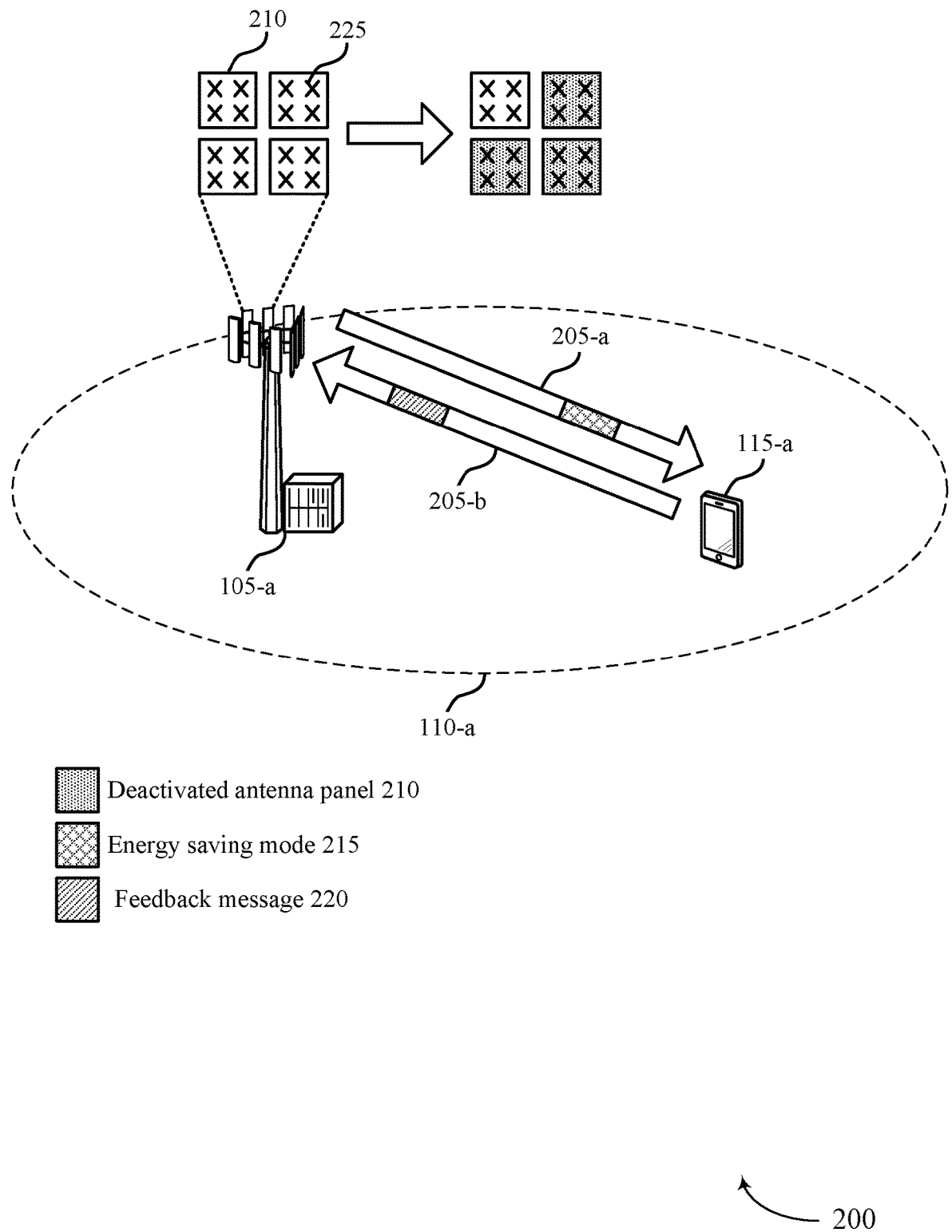
FIG. 2 illustrates an example of a wireless communications system that supports techniques for configuring use of an energy saving mode in accordance with aspects of the present disclosure.

FIG. 2 illustrates an example of a wireless communications system 200 that supports techniques for configuring use of an energy saving mode in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, base station 105-a may implement an energy saving mode implementation procedure in which base station 105-a may switch to an energy saving mode, indicate the energy saving mode to UE 115-a, and UE 115-a may receive signals from base station 105-a and/or transmit feedback to base station 105-b, accordingly. Additionally or alternatively, other wireless devices, such as a TRP or UE 115, may implement and same or similar procedure to conserve energy.

In some wireless communications systems, a network device such as base station 105-a, a transmission reception point (TRP), or some other network device may transmit one or more channel state information (CSI) reference signals (CSI-RSs) to a UE 115 (e.g., 115-a) for the purpose of channel sounding. UE 115-a may receive one or more CSI-RSs and measure one or more characteristics of a channel over which the CSI-RS was transmitted. UE 115-a may be configured to transmit, to the network device (e.g., base station 105-a), a feedback report (e.g., a CSI report, a channel state feedback (CSF) report) associated with the one or more received CSI-RSs. In some cases, UE 115-a may receive an indication of a configuration for transmitting the feedback report. For example, UE 115-a may receive an indication of one or more CSI-RS resources to monitor, and/or a type of CSI measurements to perform. UE 115-a may be configured (e.g., by radio resource control (RRC)) with a CSI resources configuration, which may be associated with at least one of multiple resource settings (e.g., non-zero power (NZP) CSI-RS for channel measurement, CSI-RS for interference measurement (CSI-IM), NZP CSI-RS for interference measurement, etc.). In some cases, UE 115-a may be configured with a link to one or more resource settings, such as a link to one resource setting (e.g., channel measurement resource (CMR)), a link to two resource settings (e.g., CMR and CSI-IM or NZP interference management resource (NZP-IMR)), a link to three resource settings (e.g., e.g., CMR and CSI-IM, and NZP-IMR).

Each of the resource settings may be associated with multiple resource sets, but only one may be active at a time. Each resource set may include one or more resources, where each resource may be associated with a transmission configuration indication (TCI) state (e.g., each resource may be transmitted with a different beam). By way of example, the NZP CSI-RS resource setting for channel measurement may include resource set n−1, resource set n, and resource set n+1. If resource set n is active, then UE 115-a may be configured with resource n1 associated with TCI state A, and resource n2 associated with TCI state B. Accordingly, based on the resource configuration UE 115-a is configured with, UE 115-a may measure CMR to measure the channel and CSI-IM and interference management resource (IMR) to measure the interference. UE 115-a may select a CMR resource from a set of CMR resources and UE 115-a may report a CSI-RS resource indicator (CRI) as part of CSI feedback (e.g., it may be beneficial for base station 105-a to know which resource the reported CSI corresponds to). Accordingly, the feedback report may be based on the indicated configuration.

In recent years there has been a growing concern over the power consumed by cellular networks due to environmental factors such as carbon emissions. As a result, network energy efficiency becomes increasingly important. In some implementations, power consumption may be influenced by larger bandwidths and increasing a number of antennas used for communications. For example, some technologies, such as sub-band full-duplex (SBFD) and massive-MIMO in lower bands may utilize multiple co-located panels where each panel may be equipped with large number of PAs and an antenna subsystem which may consume a large amount of power.

Accordingly, in some cases, a wireless network device, such as base station 105-a, may turn off (e.g., deactivate) one or more antenna panels (or sub-panels, where sub-panels may refer to a group of antenna elements 225) so as to reduce energy consumption. In some implementations, a wireless network device may dynamically adapt an antenna configuration of the wireless network device in accordance with an energy saving mode. For example, base station 105-a may configure (e.g., autonomously determine) or be configured with (e.g., pre-configured, receive a message from some other network device including the configuration) of a set of energy saving modes. Each energy mode may be associated with a number of CSI-RS resources, a number of CSI-RS ports (e.g., a number of CSI-RS ports per CSI-RS resource), a number of antenna panels, a number of antenna subpanels, or a combination thereof. For example, base station 105-a may be configured with Table 1, where Table 1 may be indicate a set of energy saving modes that base station 105-a may employ.

TABLE 1

| Energy mode Index | Number of CSI-RS ports per CSI-RS resource | Number of antenna panels (or subpanels) |
|---|---|---|
| E0 | 32 | 4 |
| E1 | 16 | 2 |
| ... | ... | ... |
| En | 4 | 1 |

It should be understood that Table 1 is merely an example. A wireless network device may be configured with energy saving mode configurations in any format (e.g., a non-table format). A wireless network device may be configured with any number of energy saving modes, where each energy saving mode may be associated with any number of parameters associated with energy saving (e.g., a number of CSI-RS resource, a number of CSI-RS ports, a number of antenna panels, a number of antenna subpanels, etc.). In some cases, energy saving modes (and the configurations associated with each mode) may be network device specific, or multiple network devices may be configured with the same set of energy saving modes and configurations.

In some cases, such energy saving procedure may impact a CSI procedure. For example, by dynamically de-activating (e.g., turning off) one or more antenna panels, the wireless network device may reduce a number of CSI-RS resources and/or a number of CSI-RS ports over which base station 105-a may transmit CSI-RSs, which may impact reception of such CSI-RSs by UE 115-a and/or impact a configuration of a CSI feedback report transmitted by UE 115-a. For example, a channel produced with a large number of antenna elements 225 may not be the same as the channel produced by a reduced number of antenna elements 225. For example, the downlink precoders, a precoding matrix indicator (PMI), a channel quality indicator (CQI), a rank indicator (RI), or a modulation and coding scheme (MCS), etc. may be dependent on how base station 105-a transmits the downlink signal. Accordingly, it may be beneficial to increase UE awareness of the energy saving procedure being used by base station 105-a because the CSF framework may change based on a number of panels 210 or antenna elements 225 being used by base station 105-a.

Accordingly, to improve a CSI procedure, base station 105-a may transmit an indication of an energy saving mode the wireless network device is using and an indication of how the energy saving mode may impact a CSI procedure. For example, UE 115-a may be configured with a set of energy saving modes and a CSI configuration associated with each energy saving mode, such as a number of CSI-RS resources, a number of CSI-RS ports, a number of antenna panels, a number of antenna subpanels, etc. For example, UE 115-a may be configured with a number of CSI-RS ports per CSI-RS resource for each energy saving mode, which may be an implicit indication of how base station 105-a is saving energy as UE 115-a may be unaware of the antenna panel configuration of base station 105-a. In another example, UE 115-a may be configured with a number of antenna panels 210 associated with each energy saving mode, which may be an explicit indication of how base station 105-a is saving energy.

In some cases, UE 115-a may be configured with Table 1 (e.g., or some variation of Table 1). UE 115-a may be preconfigured with Table 1, or may receive an indication of Table 1 from base station 105-a (e.g., via RRC signaling, broadcast signaling, MAC-CE signaling, DCI signaling). Again, it should be understood that Table 1 is merely an example. UE 115-a may be configured with energy saving mode configurations in any format (e.g., a non-table format) and may be configured with any number of energy saving modes, where each energy saving mode may be associated with any number of parameters associated with energy saving (e.g., a number of CSI-RS resource, a number of CSI-RS ports, a number of antenna panels, a number of antenna subpanels, etc.).

Upon being configured with the set of energy saving modes, UE 115-a may receive an indication of an energy saving mode 215 being implemented by base station 105-a (e.g., via communication link 205-a, which may be referred to as a downlink communication link, a channel, a beam, etc.). For example, base station 105-*a* may determine to implement energy mode, En, in which one antenna panel 210 is active (e.g., turned on). Accordingly, base station 105-*a* may deactivate (e.g., turn off, place in an idle mode) all other antenna panels 210, resulting in three deactivated antenna panels 210 with reference to the example depicted in FIG. 2. Alternatively, base station 105-*a* may determine to implement an energy saving mode, En, in which three antenna panels are turned off, and accordingly, may keep any additional antenna panels (over three) active. In either case, base station 105-*a* may transmit a message (e.g., a control message such as RRC) to UE 115-*a* indicating the energy saving mode, En. In some implementations, the contents (or payload) of the energy saving mode indication message may include an energy saving mode index (e.g., En), one or more antenna panel identifiers (e.g., to identify antenna panels that are active, inactive, or both), a number (e.g., a value) indicating how many antenna panels are active, inactive, or both.

In some implementations, UE 115-*a* may assume that base station 105-*a* is operating in accordance with a default energy saving mode (e.g., a non-energy saving mode) unless UE 115-*a* receives an indication of the energy saving mode base station 105-*a* is using.

A UE 115 may receive an indication of an energy saving mode and may determine how to receive signals from base station 105-*a* and/or how to transmit feedback to base station 105-*a*. For example, UE 115-*a* may receive the indication of energy mode, En, and may identify the configuration associated with En, such as by using Table 1. Accordingly, UE 115-*a* may determine that En is associated with four CSI-RS ports per CSI-RS resource, and/or that En is associated with one antenna panel of base station 105-*a*. In some cases, if UE 115-*a* is configured with a number of antenna panels associated with an energy saving mode, UE 115-*a* may be configured with a method for determining a number of CSI-RS ports, and/or a number of CSI-RS resources associated with the energy saving mode based on the number of active antenna panels of base station 105-*a*. For example, UE 115-*a* may be configured with a mapping between a number of CSI-RS ports and the corresponding panels and/or number of panels, and/or a mapping between specific CSI-RS ports and the corresponding panels and/or number of panels. In some cases, UE 115-*a* may be preconfigured with the mapping, or receive the mapping via control signaling (e.g., RRC signaling), such as in a same or different message that configures UE 115-*a* with the set of energy saving modes, or a same or different message that indicates the selected energy saving mode of base station 105-*a*.

In some cases, the wireless network device may indicate to one or more UEs 115 at which resource (e.g., time resource) a new energy saving mode may start. The wireless network device may allow enough time for the one or more UEs 115 to decode the energy saving mode indication message before transmitting CSI-RS with the new energy saving mode.

Accordingly, upon receiving an indication of an energy saving mode 215 employed by base station 105-*a*, and upon determining a CSI configuration associated with the indicated energy saving mode, UE 115-*a* may monitor for one or more CSI-RSs, and may perform measurements on received CSI-RSs (e.g., channel measurements, interference measurements). UE 115-*a* may include an indication of a preferred channel, or indicate the measurements in a feedback message 220 (e.g., via communications link 205-*b*, which may be referred to as an uplink communications link, a channel, a beam). The feedback message 220 may be a CSF report in accordance with the energy saving mode. In some cases, UE 115-*a* may transmit UE-assisted information to base station 105-*a*, where the UE-assisted information may include an indication of a future traffic pattern, application types being used, traffic periodicity, a CSF-based metric (e.g., reduce a number of CSI-RS ports), etc.

In some implementations, base station 105-*a* may receive feedback (e.g., CSF), UE-assisted information, or both from one UE 115 or multiple UEs 115. Base station 105-*a* may analyze the feedback, the UE-assisted information, or both from the one or more UEs 115 and determine whether to switch energy saving modes. For example, base station 105-*a* may determine that traffic in geographic coverage area 110-*a* has increased and accordingly, may determine to switch to an energy saving mode so as to increase CSI-RS resources. In some cases, the wireless network device may switch to any energy saving mode in the set such that the wireless network device may switch from E0 to E4. In some cases, the wireless network device may be configured to switch energy saving modes incrementally in order of the set such that the wireless network device may switch modes from E0 to E1, then from E1 to E2, and so on. In some cases, the wireless network device may be configured to fallback to a default energy saving mode (e.g., a non-energy saving mode) at any time, so as to ensure network reliability. Accordingly, upon switching modes, base station 105-*a* may transmit a message indicating the new energy saving mode.

In some cases, base station 105-*a* may transmit the message indicating the selected energy saving mode to a specific UE 115 (e.g., via a UE-specific message such as MAC-CE or DCI), or to multiple UEs 115, such as to each UE 115 served by base station 105-*a*, or to a group of specific UEs 115, such as a group of UEs 115 in a zone. Base station 105-*a* may transmit the energy mode indication via a broadcast message (e.g., SIB), or via a group-based message (e.g., group common (GC) DCI (GC-DCI).

In some implementations, a wireless network device may be configured with a single set of energy saving modes to use for transmitting and receiving. In some implementations, energy saving mode configurations may be direction-specific. For example, a wireless network device may be configured with a first set of energy saving modes that the wireless network device may employ while transmitting, and/or be configured with a second set of energy saving modes that the wireless network device may employ while receiving. The first set of energy saving modes and the second set of energy saving modes and configurations may be the same, partially different, or entirely different. For example, transmitting may consume more power than receiving. Accordingly, all receiving chains may be enabled all the time while the wireless network device adapts the transmitting antenna panels in accordance with an energy saving mode. Accordingly, the wireless network device may not be configured with a set of energy modes for receiving communications.

In some implementations, a wireless network device may be configured to switch energy saving modes autonomously (e.g., without restriction), such as based on traffic, load, etc. In some cases, a wireless network device may receive signaling from another network device to switch energy saving modes. In some cases, a wireless network device may be configured to switch energy saving modes based on a timer. The wireless network device may be configured with the timer (e.g., pre-configured, or receive an indication of the timer). A timer may dictate how frequently a wireless network device may switch energy saving modes. For example, the timer may be configured so that the coverage of the network is not impacted by frequent energy mode switching. For example, a wireless network device may be configured to transmit synchronization signal blocks (SSBs) across all panels (e.g., in accordance with a default energy saving mode). Accordingly, a wireless network device may switch to an energy saving mode in between SSBs, and transition back to a non-energy saving mode (e.g., default mode) to transmit SSBs. In another example, a wireless network device may transmit SSBs in accordance with an energy saving mode (e.g., such as when traffic is below a threshold, at nighttime).

In some cases, the wireless network device may be configured with categories that may dictate how frequently a wireless network device may switch energy saving modes, such as a CAT-A, CAT-B, and CAT-C. In accordance with CAT-A, the wireless network device may be configured to switch energy saving modes within 10 ms to 20 ms (e.g., and/or 20-40 slots) so that the switch occurs within an SSB periodicity). To perform dynamic adaption in accordance with CAT-A, the wireless network device may perform fast adaption (e.g., within 1-2 symbols). In accordance with CAT-B, the wireless network device may be configured to switch energy saving modes within 100 ms to 1 second. In such cases, SSB power, SSB beams, or both may be changed. In accordance with CAT-C, the wireless network device may be configured to switch energy saving modes based on RRC reconfiguration for adaptions longer than 1 second.

Figure 3A:
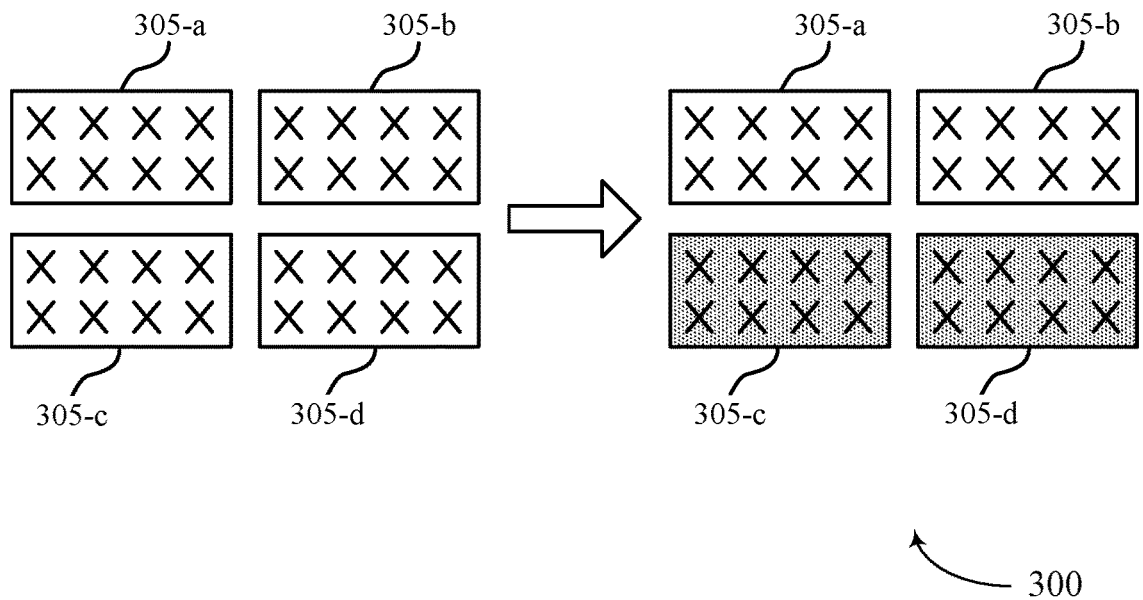
FIGS. 3A and 3B illustrate examples of energy saving mode configurations that support techniques for configuring use of an energy saving mode in accordance with aspects of the present disclosure.
Figure 3B:
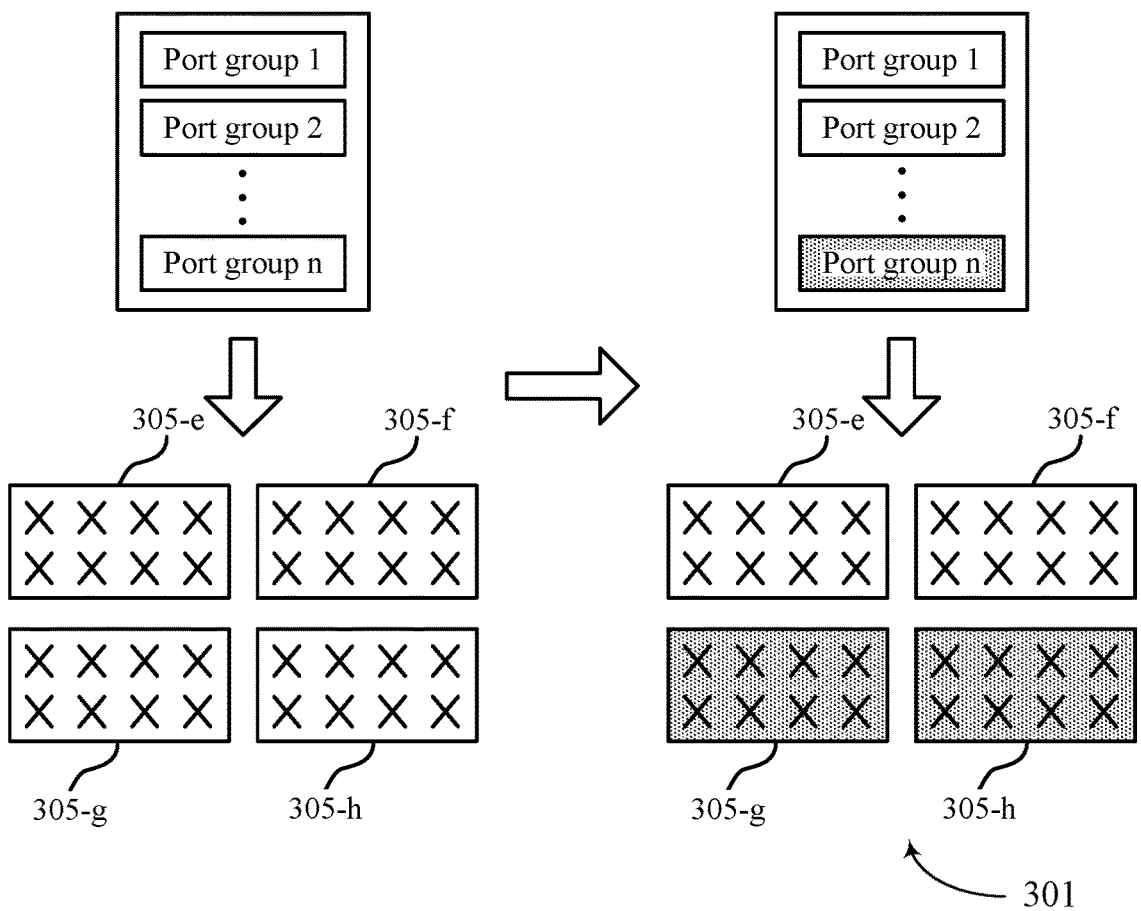

FIGS. 3A and 3B illustrate examples of energy saving mode configurations 300 and 301, respectively that support techniques for configuring use of an energy saving mode in accordance with aspects of the present disclosure. The energy saving mode configurations 300 and 301 may be implemented by a base station 105, or a TRP, a Remote radio head (RRH), an IAB node, a fixed wireless device, or a consumer customer premises equipment (CPE), which may be examples of the corresponding devices as described with reference to FIGS. 1 and 2. In some cases, a UE 115 may perform communications in accordance the energy saving mode configurations 300 and 301, where the UE 115 may be an example of the corresponding devices as described with reference to FIGS. 1 and 2.

With reference to FIG. 3A, one CSI-RS resource may be mapped with one antenna panel 305 (e.g., one-to-one mapping between CSI-RS resource and antenna panel 305). For example, antenna panel 305-a may be associated with a first CSI-RS resource, antenna panel 305-b may be associated with a second CSI-RS resource, antenna panel 305-b may be associated with a third CSI-RS resource, and antenna panel 305-d may be associated with a first CSI-RS resource (e.g., CSI-RS set={CSI-RSID1, CIS-RSID2, . . . , CSI-RSID4} may be mapped to panels 305-a, 305-b, . . . , and 305-d, respectively).

Accordingly, a wireless network device may switch from a default energy saving mode (e.g., E0 with reference to FIG. 2) to a first energy saving mode (e.g., E1 with reference to FIG. 2). Accordingly, the wireless network device may reduce the number of antenna panels 305 the wireless network device is using from four to two antenna panels 305. For example, the wireless network device may deactivate antenna panels 305-c and 305-d. In accordance with the CSI configuration associated with the first energy saving mode, the wireless network device may reduce the number of CSI-RS ports from 32 to 16 based on reducing the number of antenna panels 305 from four to two. The wireless network device may indicate to one or more UEs that the wireless network device switched to the first energy saving mode, and in some cases, may indicate that panels 305-a and 305-b are active, and/or that panels 305-c and 305-d are inactive. Based on the indication of the activate (or inactive) panels, the one or more UEs may identify the CSI-RS ports and/or CSI-RS resources that are active for monitoring CSI-RSs and transmitting a feedback report. For example, a UE may determine that a first CSI-RS resource and a second CSI-RS resources are active based on panels 305-a and 305-b being active (e.g., CSI-RS set={CSI-RSID1, CIS-RSID2} may be mapped to panels 305-a, and 305-b, respectively).

With reference to FIG. 3B, multiple CSI-RS port groups may be mapped to a single CSI-RS resource (e.g., multiple CSI-RS ports per CSI-RS resource). For example, a single CSI-RS resource may be associated with a number of port groups, such as port group 1, port group 2, port group 3, up to port group n. In some cases, a total number of ports (e.g., 32) may be divided among the port groups. For example, in the case that four port groups are configured per a CSI-RS resource, each port group may be associated with 8 CSI-RS ports.

A wireless network device may first be operating in accordance with a default energy saving mode (e.g., E0 with reference to FIG. 2), in which a total number of antenna panels 305 (e.g., panels 305-e, 305-f, 305-g, and 305-h are active) are active and accordingly, the total number of CSI-RS ports (e.g., 32 ports) are active. The wireless network device may then switch to a first energy saving mode (e.g., E1 with reference to FIG. 2), in which the wireless network device may deactivate two antenna panels 305, such as panels 305-g and 305-h. Port group 1 may be associated with panel 305-e, port group 2 may be associated with panel 305-f, port group 3 may be associated with panel 305-g, and port group 4 may be associated with panel 305-h. In some cases, the panel configuration of the wireless network device may be hidden from the UE. Accordingly, the wireless network device may transmit an indication to one or more UEs that the wireless network device switched to the first energy saving mode and indicate which ports are active (e.g., port group 1, and port group 2), and/or which ports are inactive. Based on the indication of the activate (or inactive) ports, the one or more UEs may identify the CSI-RS resources that are active for monitoring CSI-RSs and transmitting a feedback report.

Figure 4:
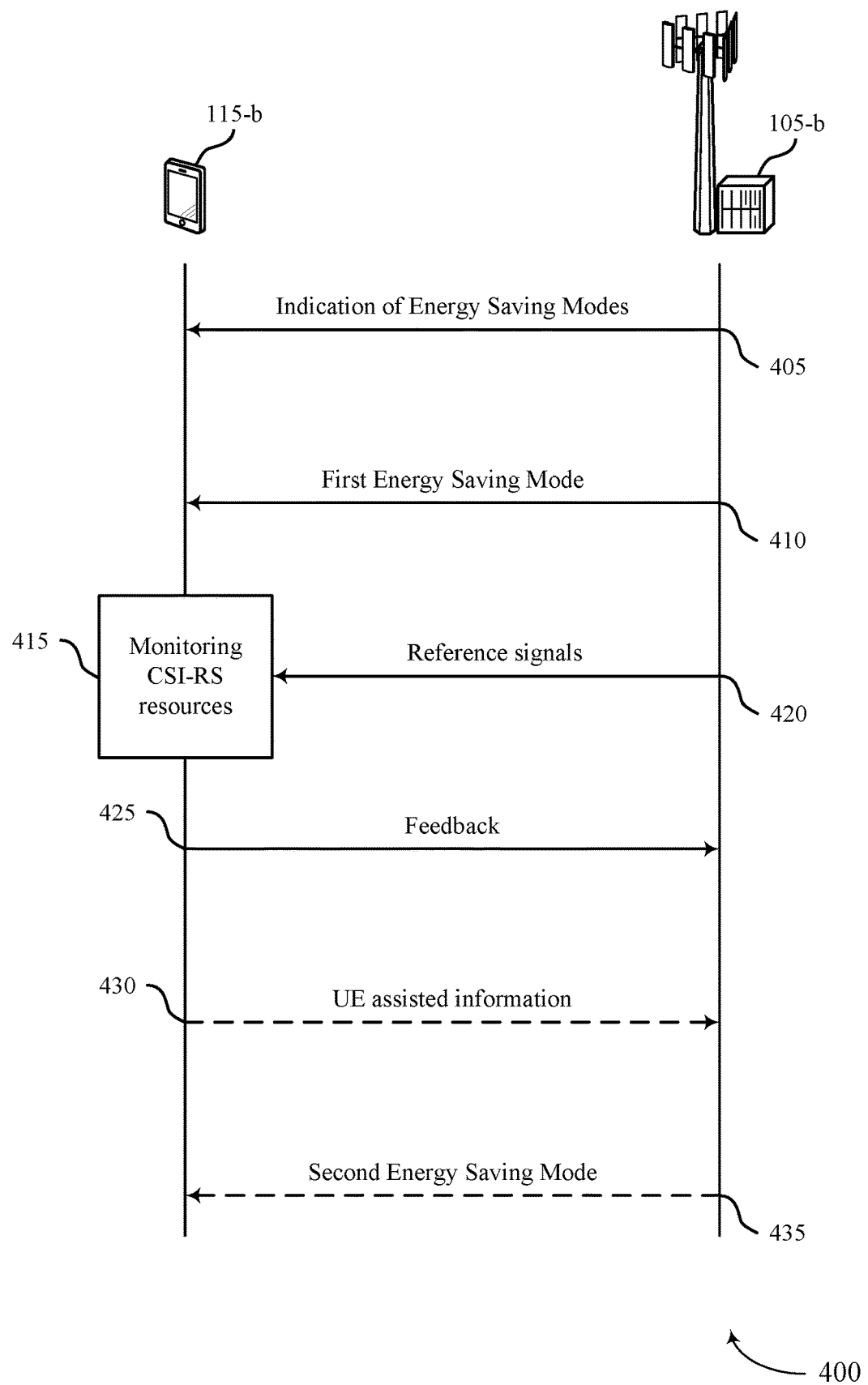
FIG. 4 illustrates an example of a process flow that supports techniques for configuring use of an energy saving mode in accordance with aspects of the present disclosure.

FIG. 4 illustrates an example of a process flow 400 that supports techniques for configuring use of an energy saving mode in accordance with aspects of the present disclosure. The process flow 400 may illustrate an example energy mode implementation procedure. For example, base station 105-b may switch to an energy saving mode, indicate the energy saving mode to UE 115-b, and UE 115-b may receive signals from base station 105-b and/or transmit feedback to base station 105-b accordingly. Base station 105-b and UE 115-b may be examples of the corresponding wireless devices described with reference to FIGS. 1 through 3B. In some cases, instead of base station 105-b implementing the energy saving mode procedure, a different type of wireless device (e.g., a UE 115, or TRP) may perform a same or similar procedure. Alternative examples of the following may be implemented, where some steps are performed in a different order than described or are not performed at all. In some cases, steps may include additional features not mentioned below, or further steps may be added.

At 405, UE 115-b may receive, from a wireless network device (e.g., base station 105-b, or a TRP of base station 105-b), a first control message comprising an indication of a set of energy saving modes of the wireless network device. In some cases, receiving the set of energy saving modes may include receiving an indication of a number of channel state information reference signal ports allocated per channel state information reference signal resource associated with each energy saving mode of the set of energy saving modes. In some cases, receiving the set of energy saving modes may include receiving an indication of a number of antenna panels of the wireless network device, a number of antenna sub-panels of the wireless network device, or both associated with each energy saving mode of the set of energy saving modes.

In some cases, receiving the first control message may include receiving a radio resource control message comprising the indication of the set of energy saving modes of the wireless network device. The first control message may indicate that the set of energy saving modes are applicable to uplink communications only, downlink communications only, or both.

At 410, UE 115-b may receive a second control message indicating a first energy saving mode from the set of energy saving modes, where the first energy saving mode may be indicative of a number of channel state information reference signal resources to be used by the wireless network device. In some cases, UE 115-b may receive a message identifying a set of channel state information reference signal ports that are activated during the energy saving mode. In some cases, UE 115-b may receive a message identifying a set of antenna panels, a set of antenna sub-panels, or both that are activated during the energy saving mode. The message may include an indication of a mapping of a set of channel state information reference signal ports corresponding with each antenna panel of the set of antenna panels, with each antenna sub-panel from the set of antenna sub-panels, or a combination thereof.

In some cases, receiving the second control message may include receiving a broadcasted message, a UE-specific message, or a group-common message indicating the first energy saving mode from the set of energy saving modes. Receiving the second control message may include receiving a radio resource control reconfiguration message indicating the first energy saving mode based at least in part on a duration between a previous energy saving mode and the first energy saving mode. The second control message may indicate the first energy saving mode is received based at least in part on a synchronization signal block configuration. Receiving the second control message may include receiving a system information block, a medium access control (MAC) control element message, or downlink control information message, or a combination thereof indicating the first energy saving mode from the set of energy saving modes.

In some implementations, UE 115-b may monitor, prior to receiving the second control message, a set of channel state information reference signal resources for the channel state information reference signal in accordance with a default energy saving mode, and may transmit, to the wireless network device, channel state information feedback determined based at least in part on measurements made by UE 115-b of the channel state information reference signal in accordance with the default energy saving mode.

At 415, UE 115-b may monitor one or more of the channel state information reference signal resources for a channel state information reference signal in accordance with the first energy saving mode.

At 420, base station 105-b may transmit one or more channel state information reference signals in accordance with the first energy saving mode.

At 425, UE 115-b may transmit, to the wireless network device, channel state information feedback determined based at least in part on measurements made by UE 115-b of the channel state information reference signal.

In some cases, at 430, UE 115-b may transmit, to the wireless network device, a signal comprising UE assisted information. The UE assisted information may be indicative of communication traffic at the UE, a number of antenna panels, a number of channel state information reference signal ports, or a combination thereof.

In some cases, at 435, UE 115-b may receive a third control message indicating a second energy saving mode from the set of energy saving modes, where the second energy saving mode may be indicative of a number of channel state information reference signal resources to be used by the wireless network device. In some cases, the second energy saving mode may be based at least in part on the UE assisted information from one or more UEs 115.

Figure 5:
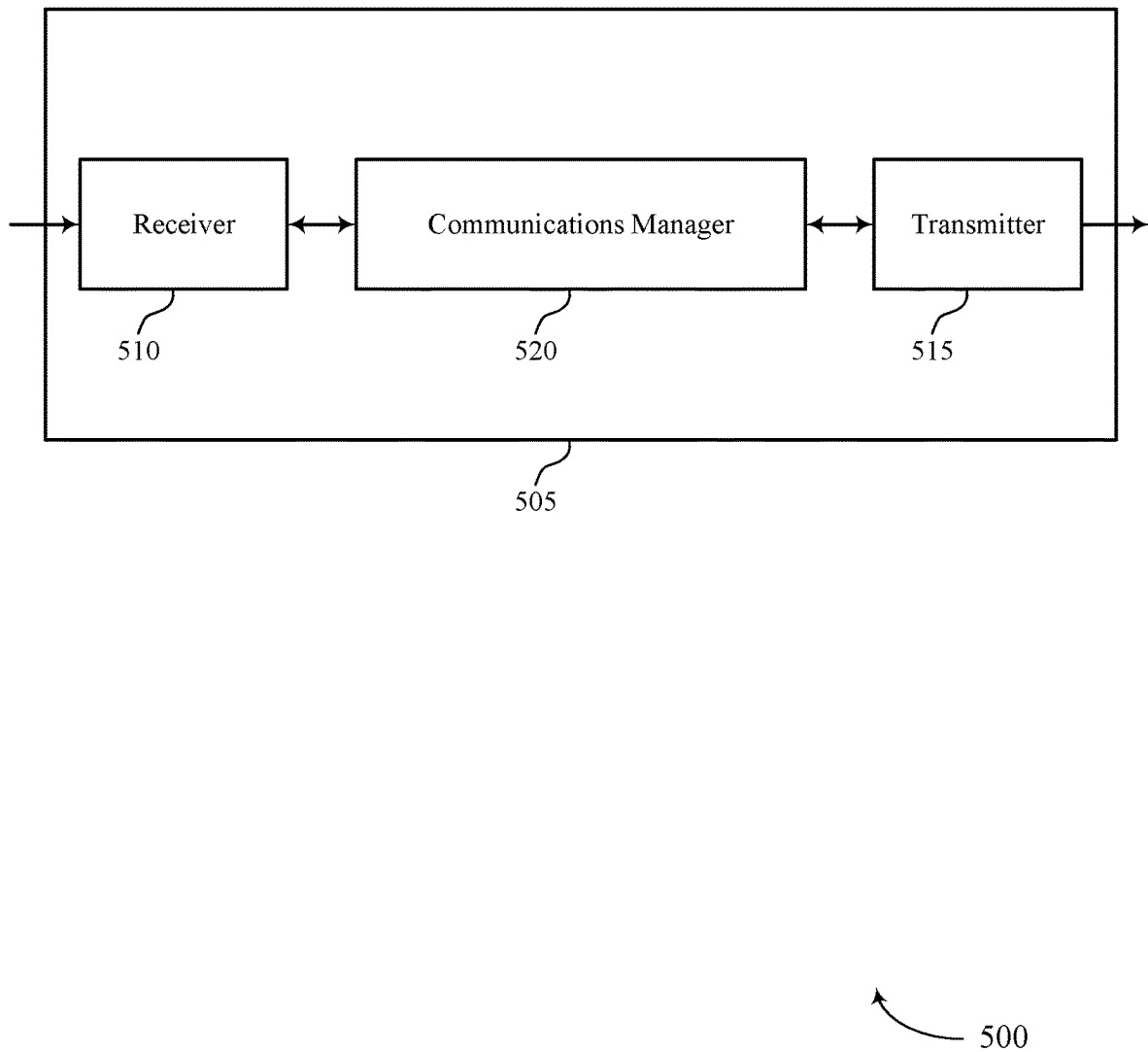
FIGS. 5 and 6 show block diagrams of devices that support techniques for configuring use of an energy saving mode in accordance with aspects of the present disclosure.

FIG. 5 shows a block diagram 500 of a device 505 that supports techniques for configuring use of an energy saving mode in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for configuring use of an energy saving mode). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for configuring use of an energy saving mode). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for configuring use of an energy saving mode as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a wireless network device, a first control message including an indication of a set of energy saving modes of the wireless network device. The communications manager 520 may be configured as or otherwise support a means for receiving a second control message indicating a first energy saving mode from the set of energy saving modes, the first energy saving mode indicative of a number of channel state information reference signal resources to be used by the wireless network device. The communications manager 520 may be configured as or otherwise support a means for monitoring one or more of the channel state information reference signal resources for a channel state information reference signal in accordance with the first energy saving mode. The communications manager 520 may be configured as or otherwise support a means for transmitting, to the wireless network device, channel state information feedback determined based on measurements made by the UE of the channel state information reference signal.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption, and more efficient utilization of communication resources.

Figure 6:
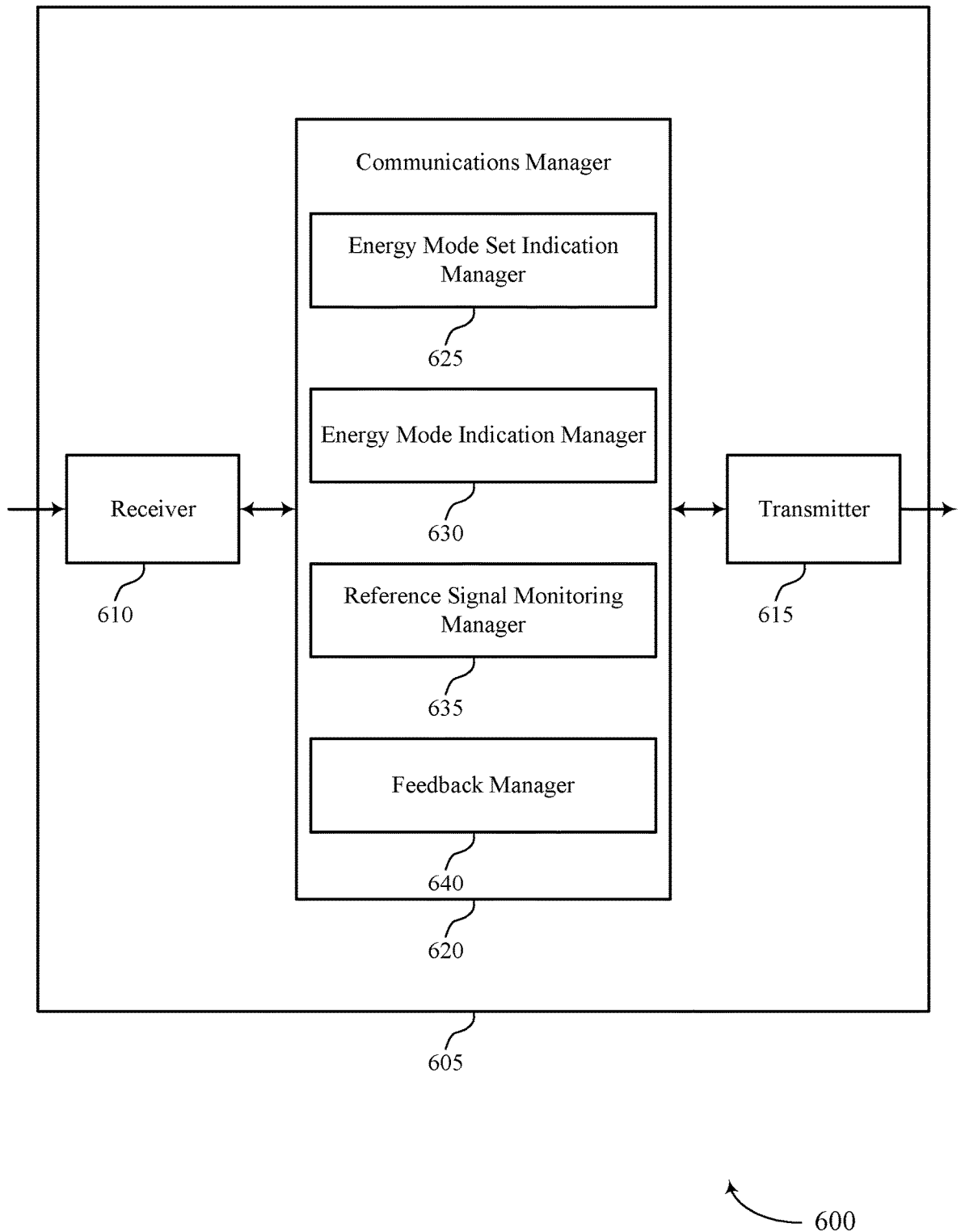

FIG. 6 shows a block diagram 600 of a device 605 that supports techniques for configuring use of an energy saving mode in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for configuring use of an energy saving mode). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for configuring use of an energy saving mode). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for configuring use of an energy saving mode as described herein. For example, the communications manager 620 may include an energy mode set indication manager 625, an energy mode indication manager 630, a reference signal monitoring manager 635, a feedback manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The energy mode set indication manager 625 may be configured as or otherwise support a means for receiving, from a wireless network device, a first control message including an indication of a set of energy saving modes of the wireless network device. The energy mode indication manager 630 may be configured as or otherwise support a means for receiving a second control message indicating a first energy saving mode from the set of energy saving modes, the first energy saving mode indicative of a number of channel state information reference signal resources to be used by the wireless network device. The reference signal monitoring manager 635 may be configured as or otherwise support a means for monitoring one or more of the channel state information reference signal resources for a channel state information reference signal in accordance with the first energy saving mode. The feedback manager 640 may be configured as or otherwise support a means for transmitting, to the wireless network device, channel state information feedback determined based on measurements made by the UE of the channel state information reference signal.

Figure 7:
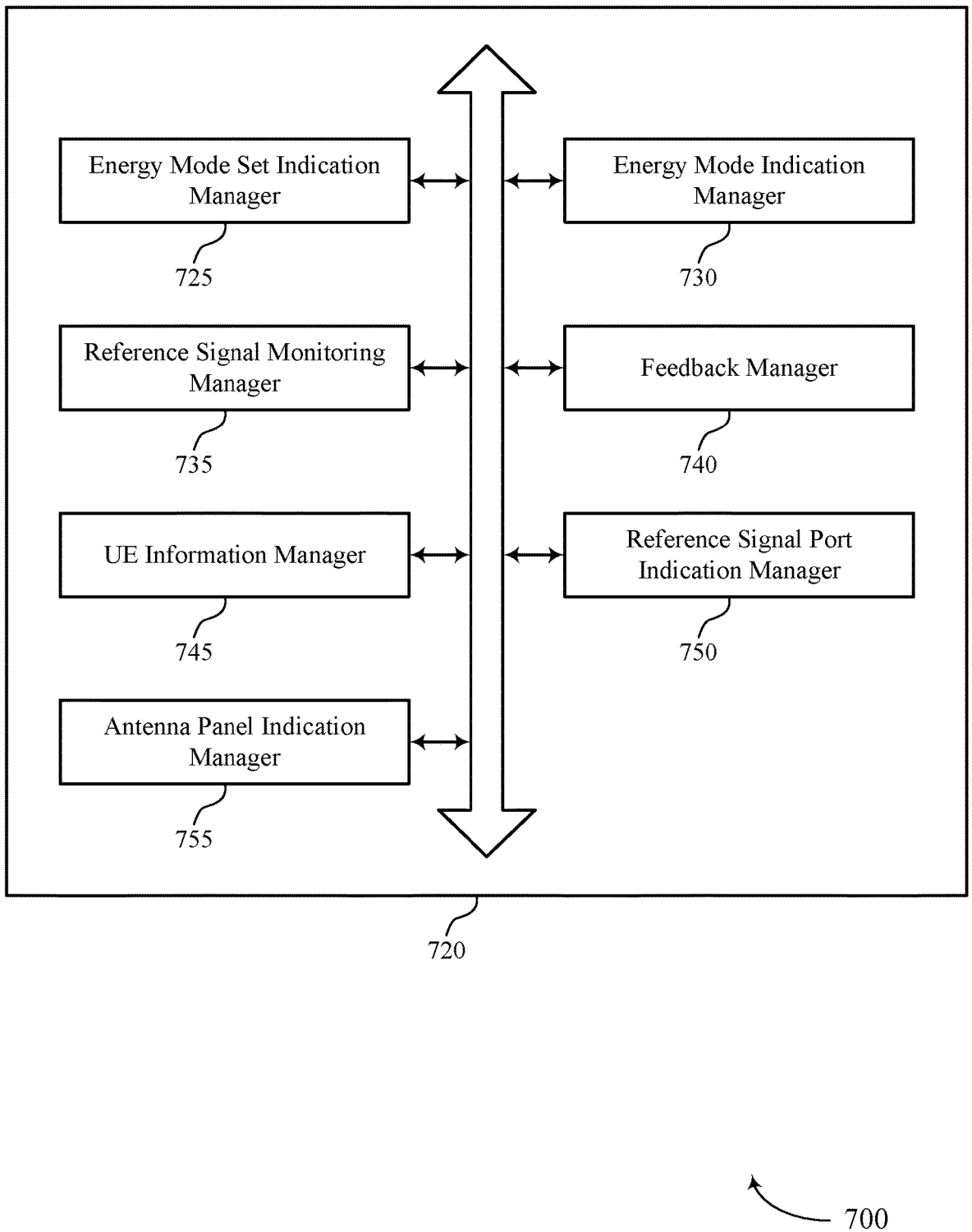
FIG. 7 shows a block diagram of a communications manager that supports techniques for configuring use of an energy saving mode in accordance with aspects of the present disclosure.

FIG. 7 shows a block diagram 700 of a communications manager 720 that supports techniques for configuring use of an energy saving mode in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for configuring use of an energy saving mode as described herein. For example, the communications manager 720 may include an energy mode set indication manager 725, an energy mode indication manager 730, a reference signal monitoring manager 735, a feedback manager 740, a UE information manager 745, a reference signal port indication manager 750, an antenna panel indication manager 755, or any combination thereof. Each of these components may communicate, directly or indirectly, with one another (e.g., via one or more buses).

The communications manager 720 may support wireless communications at a UE in accordance with examples as disclosed herein. The energy mode set indication manager 725 may be configured as or otherwise support a means for receiving, from a wireless network device, a first control message including an indication of a set of energy saving modes of the wireless network device. The energy mode indication manager 730 may be configured as or otherwise support a means for receiving a second control message indicating a first energy saving mode from the set of energy saving modes, the first energy saving mode indicative of a number of channel state information reference signal resources to be used by the wireless network device. The reference signal monitoring manager 735 may be configured as or otherwise support a means for monitoring one or more of the channel state information reference signal resources for a channel state information reference signal in accordance with the first energy saving mode. The feedback manager 740 may be configured as or otherwise support a means for transmitting, to the wireless network device, channel state information feedback determined based on measurements made by the UE of the channel state information reference signal.

In some examples, the UE information manager 745 may be configured as or otherwise support a means for transmitting, to the wireless network device, a signal including UE assisted information, the UE assisted information indicative of communication traffic at the UE, a number of antenna panels, a number of channel state information reference signal ports, or a combination thereof, where the first energy saving mode is based on the UE assisted information.

In some examples, to support receiving the set of energy saving modes, the reference signal port indication manager 750 may be configured as or otherwise support a means for receiving an indication of a number of channel state information reference signal ports allocated per channel state information reference signal resource associated with each energy saving mode of the set of energy saving modes.

In some examples, the reference signal port indication manager 750 may be configured as or otherwise support a means for receiving a message identifying a set of channel state information reference signal ports that are activated during the energy saving mode.

In some examples, to support receiving the set of energy saving modes, the antenna panel indication manager 755 may be configured as or otherwise support a means for receiving an indication of a number of antenna panels of the wireless network device, a number of antenna sub-panels of the wireless network device, or both associated with each energy saving mode of the set of energy saving modes.

In some examples, the antenna panel indication manager 755 may be configured as or otherwise support a means for receiving a message identifying a set of antenna panels, a set of antenna sub-panels, or both that are activated during the energy saving mode.

In some examples, the message includes an indication of a mapping of a set of channel state information reference signal ports corresponding with each antenna panel of the set of antenna panels, with each antenna sub-panel from the set of antenna sub-panels, or a combination thereof.

In some examples, the reference signal monitoring manager 735 may be configured as or otherwise support a means for monitoring, prior to receiving the second control message, a set of channel state information reference signal resources for the channel state information reference signal in accordance with a default energy saving mode. In some examples, the feedback manager 740 may be configured as or otherwise support a means for transmitting, to the wireless network device, channel state information feedback determined based on measurements made by the UE of the channel state information reference signal in accordance with the default energy saving mode.

In some examples, to support receiving the first control message, the energy mode set indication manager 725 may be configured as or otherwise support a means for receiving a radio resource control message including the indication of the set of energy saving modes of the wireless network device.

In some examples, the first control message indicates that the set of energy saving modes are applicable to uplink communications only, downlink communications only, or both.

In some examples, to support receiving the second control message, the energy mode indication manager 730 may be configured as or otherwise support a means for receiving a broadcasted message, a UE-specific message, or a group-common message indicating the first energy saving mode from the set of energy saving modes.

In some examples, to support receiving the second control message, the energy mode indication manager 730 may be configured as or otherwise support a means for receiving a radio resource control reconfiguration message indicating the first energy saving mode based on a duration between a previous energy saving mode and the first energy saving mode.

In some examples, the second control message indicating the first energy saving mode is received based on a synchronization signal block configuration.

In some examples, to support receiving the second control message, the energy mode indication manager 730 may be configured as or otherwise support a means for receiving a system information block, a medium access control (MAC) control element message, or downlink control information message, or a combination thereof indicating the first energy saving mode from the set of energy saving modes.

In some examples, the wireless network device is a base station, or a transmission reception point of the base station.

Figure 8:
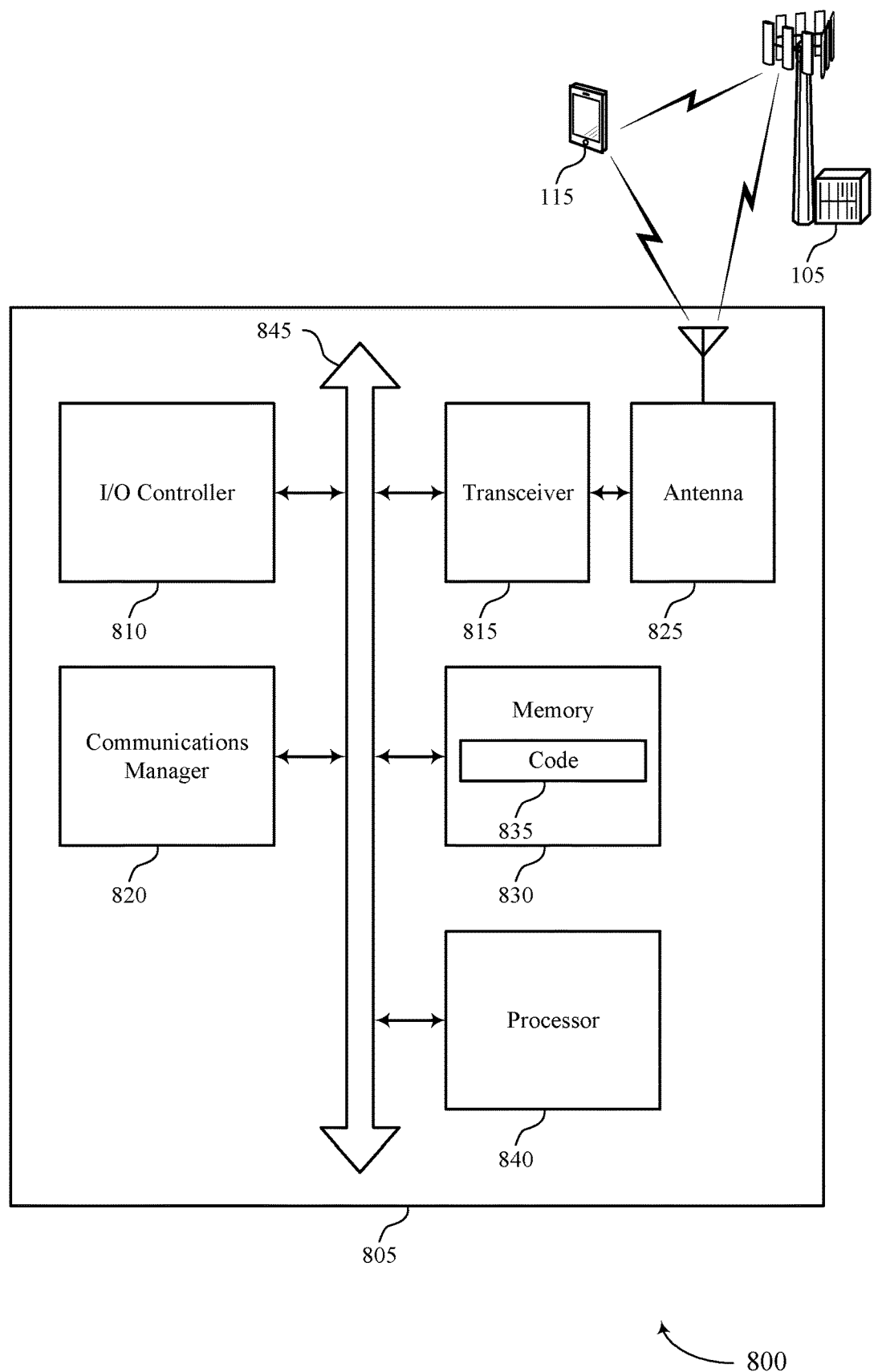
FIG. 8 shows a diagram of a system including a device that supports techniques for configuring use of an energy saving mode in accordance with aspects of the present disclosure.

FIG. 8 shows a diagram of a system 800 including a device 805 that supports techniques for configuring use of an energy saving mode in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for configuring use of an energy saving mode). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a wireless network device, a first control message including an indication of a set of energy saving modes of the wireless network device. The communications manager 820 may be configured as or otherwise support a means for receiving a second control message indicating a first energy saving mode from the set of energy saving modes, the first energy saving mode indicative of a number of channel state information reference signal resources to be used by the wireless network device. The communications manager 820 may be configured as or otherwise support a means for monitoring one or more of the channel state information reference signal resources for a channel state information reference signal in accordance with the first energy saving mode. The communications manager 820 may be configured as or otherwise support a means for transmitting, to the wireless network device, channel state information feedback determined based on measurements made by the UE of the channel state information reference signal.

By including or configuring the communications manager 820 in accordance with examples as described herein, the device 805 may support techniques for reduced power consumption, more efficient utilization of communication resources, improved coordination between devices, and longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for configuring use of an energy saving mode as described herein, or the processor 840 and the memory 830 may be otherwise configured to perform or support such operations.

Figure 9:
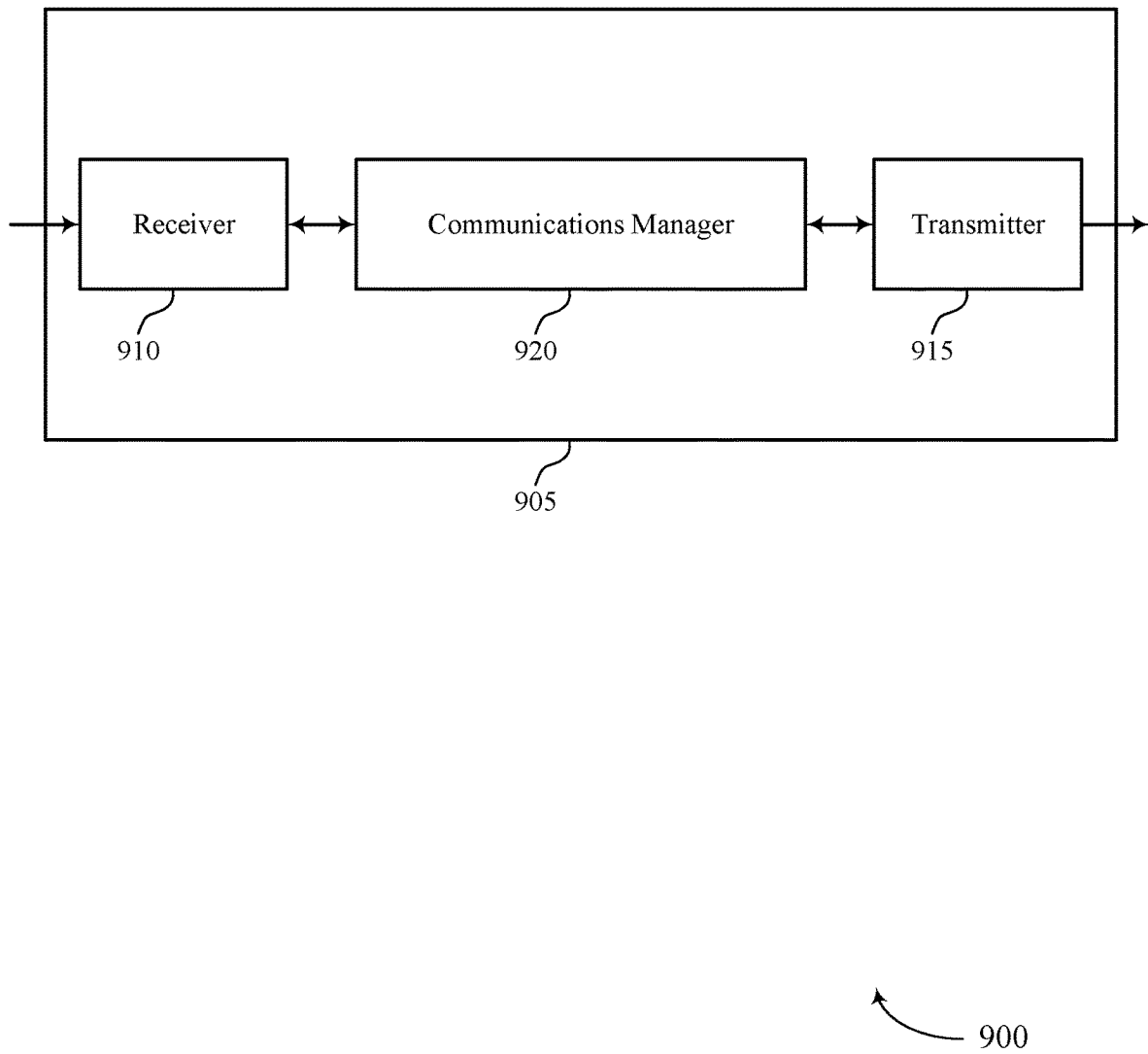
FIGS. 9 and 10 show block diagrams of devices that support techniques for configuring use of an energy saving mode in accordance with aspects of the present disclosure.

FIG. 9 shows a block diagram 900 of a device 905 that supports techniques for configuring use of an energy saving mode in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for configuring use of an energy saving mode). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for configuring use of an energy saving mode). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for configuring use of an energy saving mode as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a wireless network device in accordance with examples as disclosed herein. For example, the communications manager 920 may be configured as or otherwise support a means for transmitting, to a UE, a first control message including an indication of a set of energy saving modes of the wireless network device. The communications manager 920 may be configured as or otherwise support a means for transmitting a second control message indicating a first energy saving mode from the set of energy saving modes, the first energy saving mode indicative of a number of channel state information reference signal resources to be used by the wireless network device. The communications manager 920 may be configured as or otherwise support a means for transmitting one or more channel state information reference signals in accordance with the first energy saving mode. The communications manager 920 may be configured as or otherwise support a means for receiving, from the UE, channel state information feedback determined based on measurements made by the UE of the one or more channel state information reference signals.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption, and more efficient utilization of communication resources.

Figure 10:
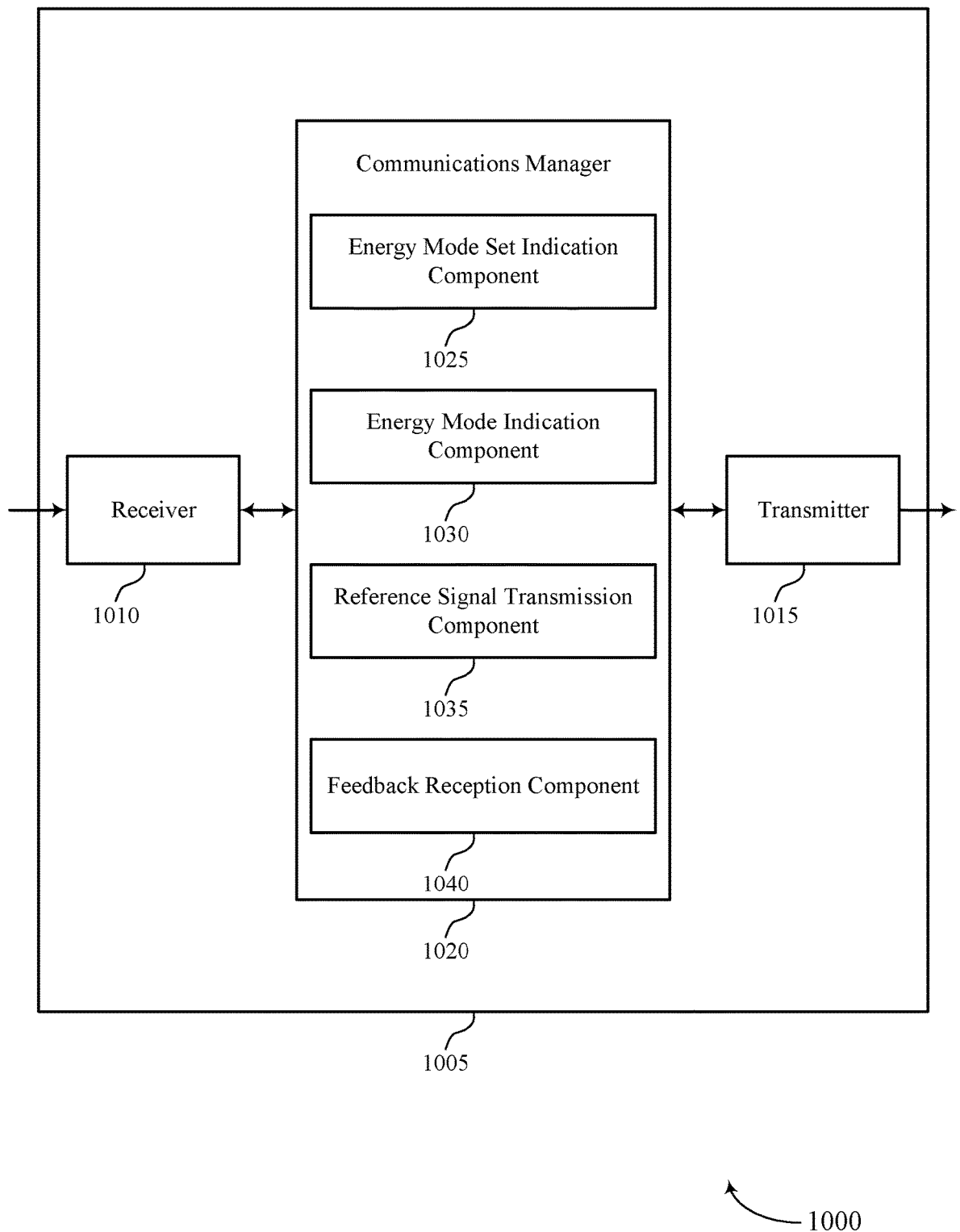

FIG. 10 shows a block diagram 1000 of a device 1005 that supports techniques for configuring use of an energy saving mode in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for configuring use of an energy saving mode). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for configuring use of an energy saving mode). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for configuring use of an energy saving mode as described herein. For example, the communications manager 1020 may include an energy mode set indication component 1025, an energy mode indication component 1030, a reference signal transmission component 1035, a feedback reception component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a wireless network device in accordance with examples as disclosed herein. The energy mode set indication component 1025 may be configured as or otherwise support a means for transmitting, to a UE, a first control message including an indication of a set of energy saving modes of the wireless network device. The energy mode indication component 1030 may be configured as or otherwise support a means for transmitting a second control message indicating a first energy saving mode from the set of energy saving modes, the first energy saving mode indicative of a number of channel state information reference signal resources to be used by the wireless network device. The reference signal transmission component 1035 may be configured as or otherwise support a means for transmitting one or more channel state information reference signals in accordance with the first energy saving mode. The feedback reception component 1040 may be configured as or otherwise support a means for receiving, from the UE, channel state information feedback determined based on measurements made by the UE of the one or more channel state information reference signals.

Figure 11:
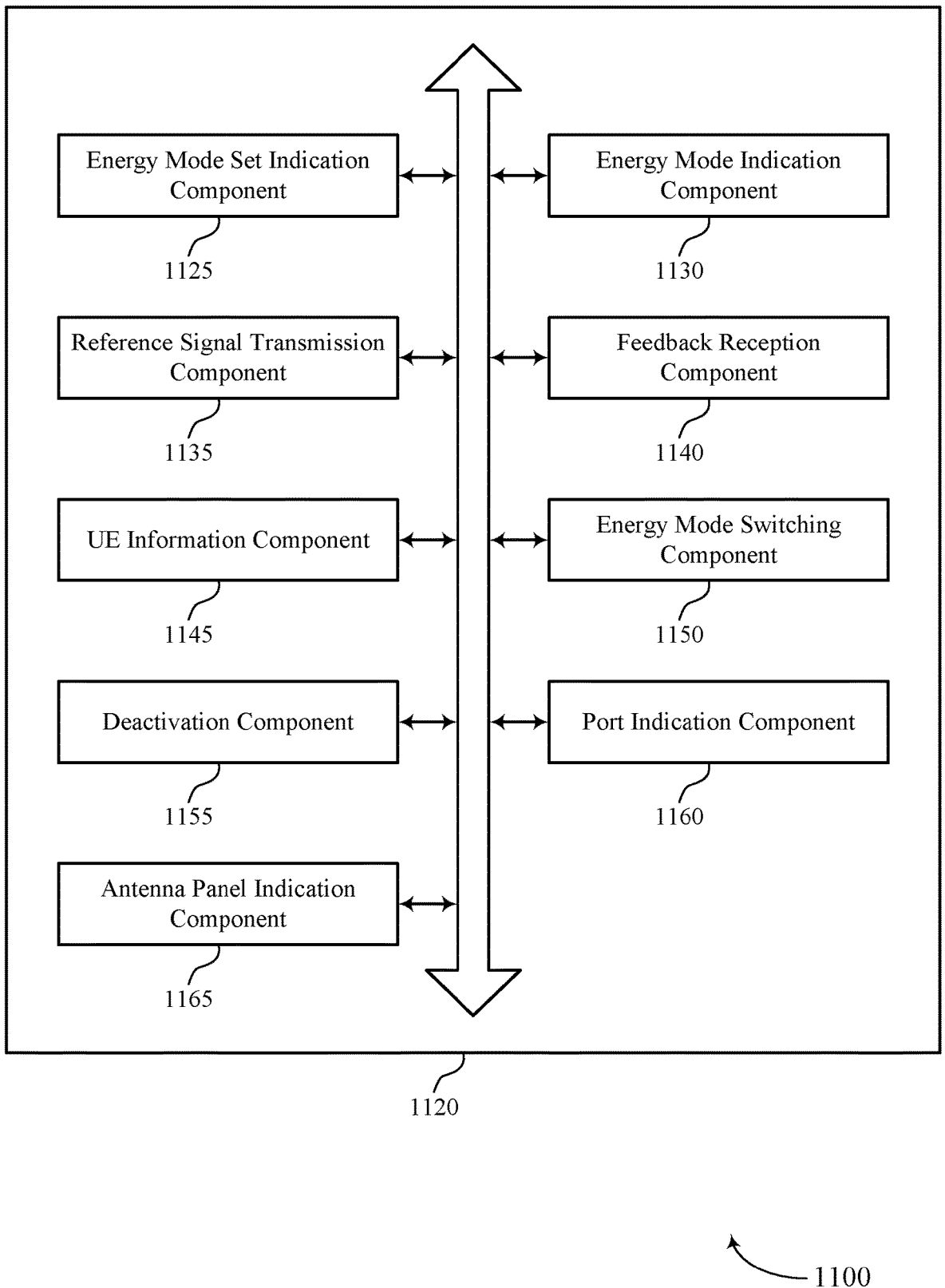
FIG. 11 shows a block diagram of a communications manager that supports techniques for configuring use of an energy saving mode in accordance with aspects of the present disclosure.

FIG. 11 shows a block diagram 1100 of a communications manager 1120 that supports techniques for configuring use of an energy saving mode in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for configuring use of an energy saving mode as described herein. For example, the communications manager 1120 may include an energy mode set indication component 1125, an energy mode indication component 1130, a reference signal transmission component 1135, a feedback reception component 1140, a UE information component 1145, an energy mode switching component 1150, a deactivation component 1155, a port indication component 1160, an antenna panel indication component 1165, or any combination thereof. Each of these components may communicate, directly or indirectly, with one another (e.g., via one or more buses).

The communications manager 1120 may support wireless communications at a wireless network device in accordance with examples as disclosed herein. The energy mode set indication component 1125 may be configured as or otherwise support a means for transmitting, to a UE, a first control message including an indication of a set of energy saving modes of the wireless network device. The energy mode indication component 1130 may be configured as or otherwise support a means for transmitting a second control message indicating a first energy saving mode from the set of energy saving modes, the first energy saving mode indicative of a number of channel state information reference signal resources to be used by the wireless network device. The reference signal transmission component 1135 may be configured as or otherwise support a means for transmitting one or more channel state information reference signals in accordance with the first energy saving mode. The feedback reception component 1140 may be configured as or otherwise support a means for receiving, from the UE, channel state information feedback determined based on measurements made by the UE of the one or more channel state information reference signals.

In some examples, the UE information component 1145 may be configured as or otherwise support a means for receiving, from at least the UE, a signal including UE assisted information, the UE assisted information indicative of communication traffic at the UE, a number of antenna panels, a number of channel state information reference signal ports, or a combination thereof. In some examples, the energy mode switching component 1150 may be configured as or otherwise support a means for determining to switch energy saving modes based on the UE assisted information from at least the UE.

In some examples, the deactivation component 1155 may be configured as or otherwise support a means for deactivating one or more channel state information reference signals ports, one or more antenna panels, one or more antenna sub-panels, or a combination thereof based on the first energy saving mode.

In some examples, to support transmitting the set of energy saving modes, the port indication component 1160 may be configured as or otherwise support a means for transmitting an indication of a number of channel state information reference signal ports allocated per channel state information reference signal resource associated with each energy saving mode of the set of energy saving modes.

In some examples, the port indication component 1160 may be configured as or otherwise support a means for transmitting a message identifying a set of channel state information reference signal ports that are activated during the energy saving mode.

In some examples, the channel state information reference signal ports are configured into one or more groups.

In some examples, to support transmitting the set of energy saving modes, the antenna panel indication component 1165 may be configured as or otherwise support a means for transmitting an indication of a number of antenna panels, a number of antenna sub-panels, or both associated with each energy saving mode of the set of energy saving modes.

In some examples, the antenna panel indication component 1165 may be configured as or otherwise support a means for transmitting a message identifying a set of antenna panels, a set of antenna sub-panels, or both that are activated during the energy saving mode.

In some examples, the message includes an indication of a mapping of a set of channel state information reference signal ports corresponding with each antenna panel of the set of antenna panels, with each antenna sub-panel from the set of antenna sub-panels, or a combination thereof.

In some examples, the reference signal transmission component 1135 may be configured as or otherwise support a means for transmitting, one or more channel state information references signals via a set of resources in accordance with a default energy saving mode. In some examples, the feedback reception component 1140 may be configured as or otherwise support a means for receiving, from the UE, channel state information feedback determined based on measurements made by the UE of the one or more channel state information reference signals in accordance with the default energy saving mode.

In some examples, the energy mode switching component 1150 may be configured as or otherwise support a means for determining to switch to the first energy saving mode from the default energy saving mode, where transmitting the second control message is based on the determination.

In some examples, to support transmitting the first control message, the energy mode indication component 1130 may be configured as or otherwise support a means for transmitting a radio resource control message including the indication of the set of energy saving modes of the wireless network device.

In some examples, the first control message indicates that the set of energy saving modes are applicable to uplink communications, downlink communications, or both.

In some examples, to support transmitting the second control message, the energy mode indication component 1130 may be configured as or otherwise support a means for transmitting a broadcasted message, a UE-specific message, or a group-common message indicating the first energy saving mode from the set of energy saving modes.

In some examples, to support transmitting the second control message, the energy mode indication component 1130 may be configured as or otherwise support a means for transmitting a radio resource control reconfiguration message indicating the first energy saving mode based on a duration between a previous energy saving mode and the first energy saving mode.

In some examples, the second control message indicating the first energy saving mode is received based on a synchronization signal block configuration.

In some examples, to support transmitting the second control message, the energy mode indication component 1130 may be configured as or otherwise support a means for transmitting a system information block, a medium access control (MAC) control element message, or downlink control information message, or a combination thereof indicating the first energy saving mode from the set of energy saving modes.

In some examples, the wireless network device is a base station, or a transmission reception point of the base station.

Figure 12:
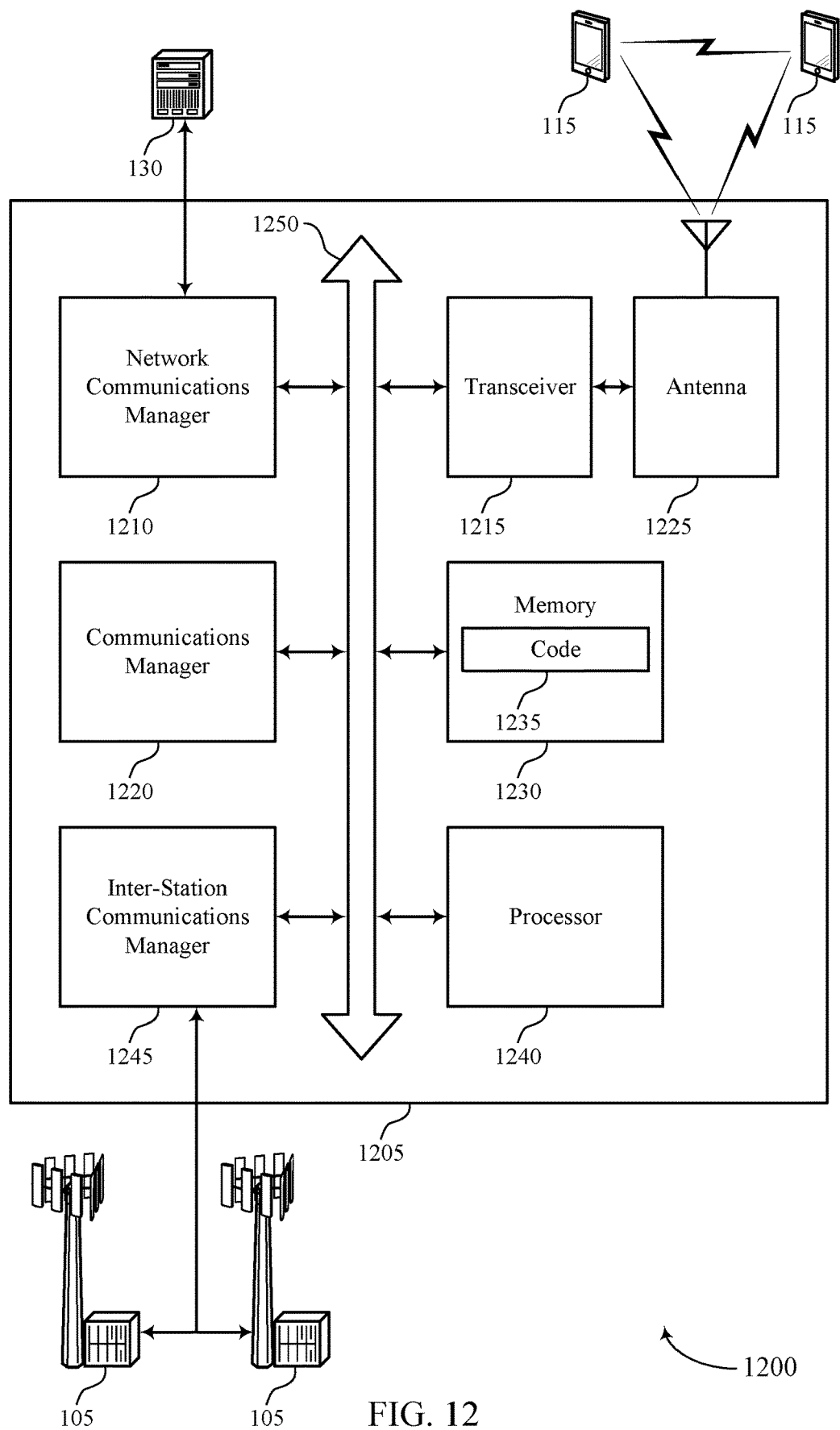
FIG. 12 shows a diagram of a system including a device that supports techniques for configuring use of an energy saving mode in accordance with aspects of the present disclosure.

FIG. 12 shows a diagram of a system 1200 including a device 1205 that supports techniques for configuring use of an energy saving mode in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for configuring use of an energy saving mode). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a wireless network device in accordance with examples as disclosed herein. For example, the communications manager 1220 may be configured as or otherwise support a means for transmitting, to a UE, a first control message including an indication of a set of energy saving modes of the wireless network device. The communications manager 1220 may be configured as or otherwise support a means for transmitting a second control message indicating a first energy saving mode from the set of energy saving modes, the first energy saving mode indicative of a number of channel state information reference signal resources to be used by the wireless network device. The communications manager 1220 may be configured as or otherwise support a means for transmitting one or more channel state information reference signals in accordance with the first energy saving mode. The communications manager 1220 may be configured as or otherwise support a means for receiving, from the UE, channel state information feedback determined based on measurements made by the UE of the one or more channel state information reference signals.

By including or configuring the communications manager 1220 in accordance with examples as described herein, the device 1205 may support techniques for reduced power consumption, more efficient utilization of communication resources, improved coordination between devices, and longer battery life.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for configuring use of an energy saving mode as described herein, or the processor 1240 and the memory 1230 may be otherwise configured to perform or support such operations.

Figure 13:
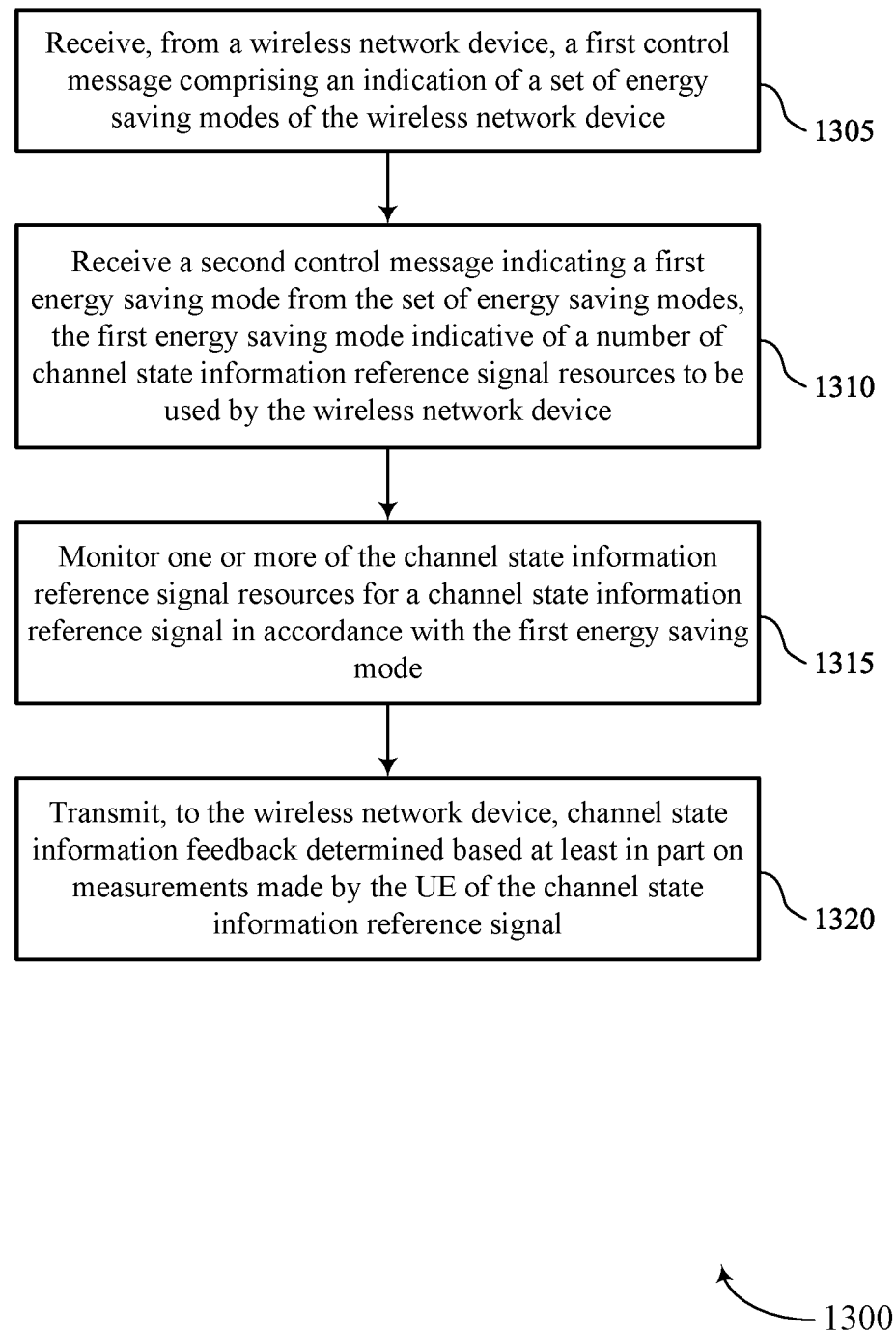
FIGS. 13 through 16 show flowcharts illustrating methods that support techniques for configuring use of an energy saving mode in accordance with aspects of the present disclosure.

FIG. 13 shows a flowchart illustrating a method 1300 that supports techniques for configuring use of an energy saving mode in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a wireless network device, a first control message including an indication of a set of energy saving modes of the wireless network device. The operations of 1305 may be performed in accordance with examples as disclosed herein. In some examples, aspects of the operations of 1305 may be performed by an energy mode set indication manager 725 as described with reference to FIG. 7.

At 1310, the method may include receiving a second control message indicating a first energy saving mode from the set of energy saving modes, the first energy saving mode indicative of a number of channel state information reference signal resources to be used by the wireless network device. The operations of 1310 may be performed in accordance with examples as disclosed herein. In some examples, aspects of the operations of 1310 may be performed by an energy mode indication manager 730 as described with reference to FIG. 7.

At 1315, the method may include monitoring one or more of the channel state information reference signal resources for a channel state information reference signal in accordance with the first energy saving mode. The operations of 1315 may be performed in accordance with examples as disclosed herein. In some examples, aspects of the operations of 1315 may be performed by a reference signal monitoring manager 735 as described with reference to FIG. 7.

At 1320, the method may include transmitting, to the wireless network device, channel state information feedback determined based on measurements made by the UE of the channel state information reference signal. The operations of 1320 may be performed in accordance with examples as disclosed herein. In some examples, aspects of the operations of 1320 may be performed by a feedback manager 740 as described with reference to FIG. 7.

Figure 14:
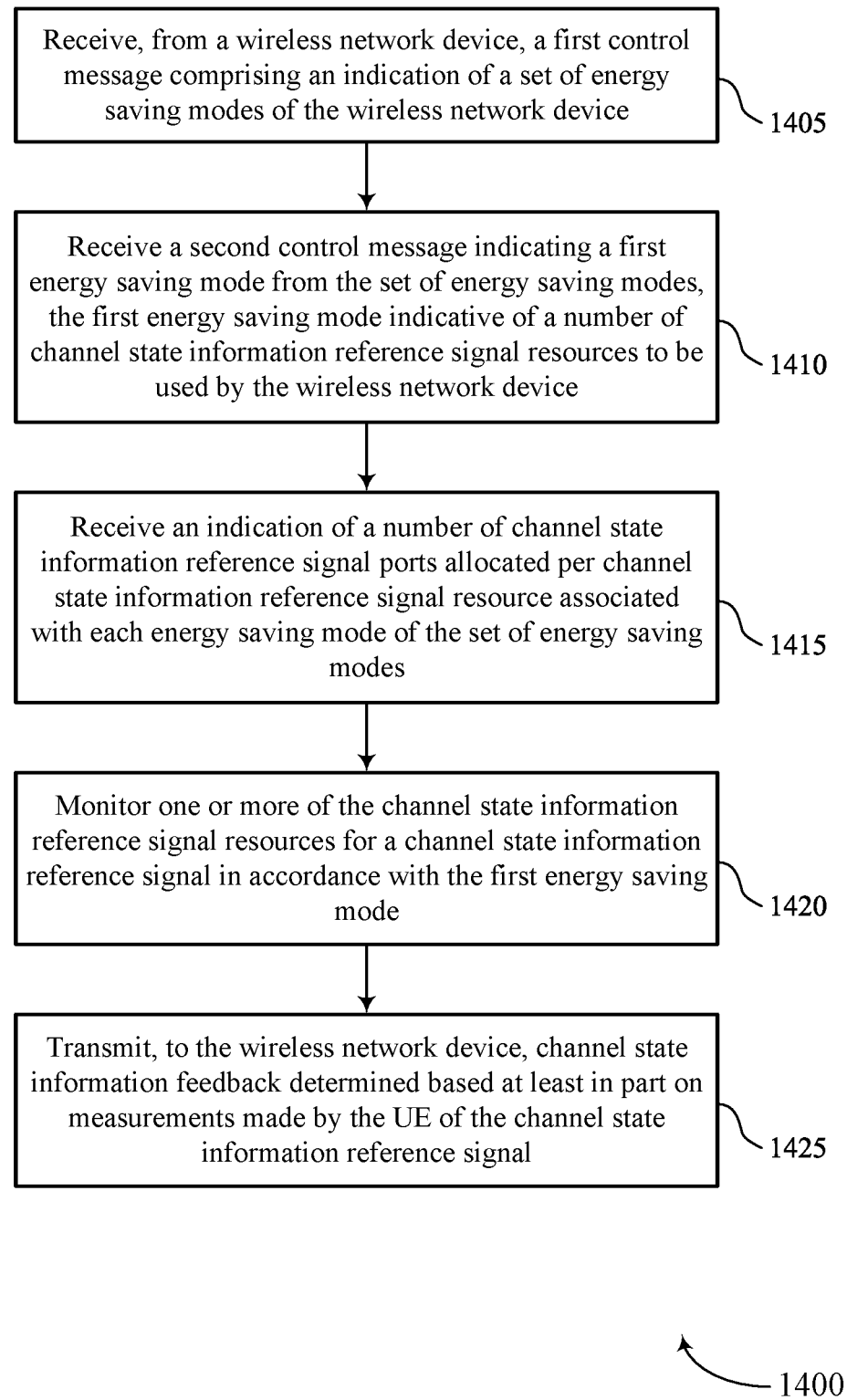

FIG. 14 shows a flowchart illustrating a method 1400 that supports techniques for configuring use of an energy saving mode in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a wireless network device, a first control message including an indication of a set of energy saving modes of the wireless network device. The operations of 1405 may be performed in accordance with examples as disclosed herein. In some examples, aspects of the operations of 1405 may be performed by an energy mode set indication manager 725 as described with reference to FIG. 7.

At 1410, the method may include receiving a second control message indicating a first energy saving mode from the set of energy saving modes, the first energy saving mode indicative of a number of channel state information reference signal resources to be used by the wireless network device. The operations of 1410 may be performed in accordance with examples as disclosed herein. In some examples, aspects of the operations of 1410 may be performed by an energy mode indication manager 730 as described with reference to FIG. 7.

At 1415, the method may include receiving an indication of a number of channel state information reference signal ports allocated per channel state information reference signal resource associated with each energy saving mode of the set of energy saving modes. The operations of 1415 may be performed in accordance with examples as disclosed herein. In some examples, aspects of the operations of 1415 may be performed by a reference signal port indication manager 750 as described with reference to FIG. 7.

At 1420, the method may include monitoring one or more of the channel state information reference signal resources for a channel state information reference signal in accordance with the first energy saving mode. The operations of 1420 may be performed in accordance with examples as disclosed herein. In some examples, aspects of the operations of 1420 may be performed by a reference signal monitoring manager 735 as described with reference to FIG. 7.

At 1425, the method may include transmitting, to the wireless network device, channel state information feedback determined based on measurements made by the UE of the channel state information reference signal. The operations of 1425 may be performed in accordance with examples as disclosed herein. In some examples, aspects of the operations of 1425 may be performed by a feedback manager 740 as described with reference to FIG. 7.

Figure 15:
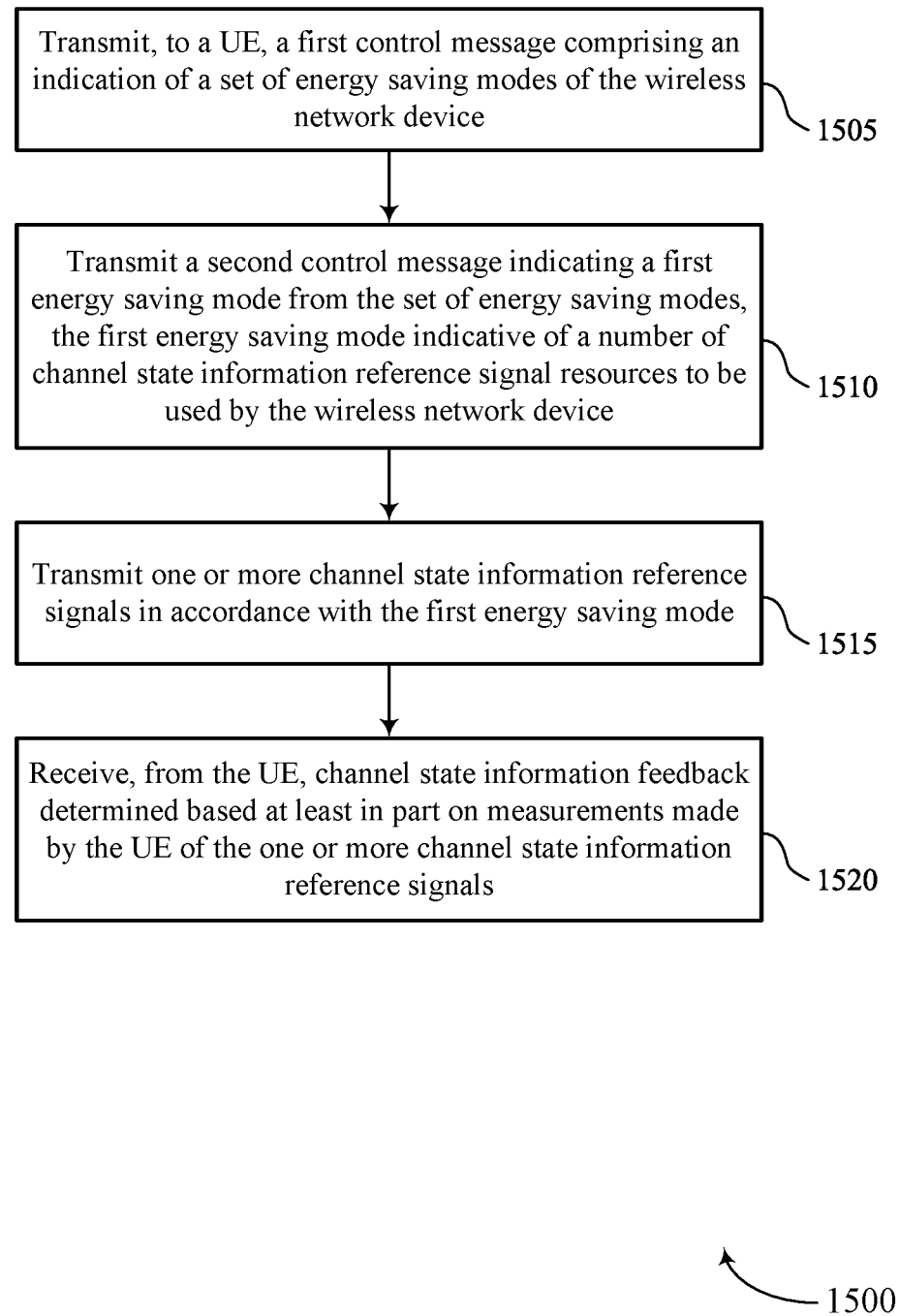

FIG. 15 shows a flowchart illustrating a method 1500 that supports techniques for configuring use of an energy saving mode in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a first control message including an indication of a set of energy saving modes of the wireless network device. The operations of 1505 may be performed in accordance with examples as disclosed herein. In some examples, aspects of the operations of 1505 may be performed by an energy mode set indication component 1125 as described with reference to FIG. 11.

At 1510, the method may include transmitting a second control message indicating a first energy saving mode from the set of energy saving modes, the first energy saving mode indicative of a number of channel state information reference signal resources to be used by the wireless network device. The operations of 1510 may be performed in accordance with examples as disclosed herein. In some examples, aspects of the operations of 1510 may be performed by an energy mode indication component 1130 as described with reference to FIG. 11.

At 1515, the method may include transmitting one or more channel state information reference signals in accordance with the first energy saving mode. The operations of 1515 may be performed in accordance with examples as disclosed herein. In some examples, aspects of the operations of 1515 may be performed by a reference signal transmission component 1135 as described with reference to FIG. 11.

At 1520, the method may include receiving, from the UE, channel state information feedback determined based on measurements made by the UE of the one or more channel state information reference signals. The operations of 1520 may be performed in accordance with examples as disclosed herein. In some examples, aspects of the operations of 1520 may be performed by a feedback reception component 1140 as described with reference to FIG. 11.

Figure 16:
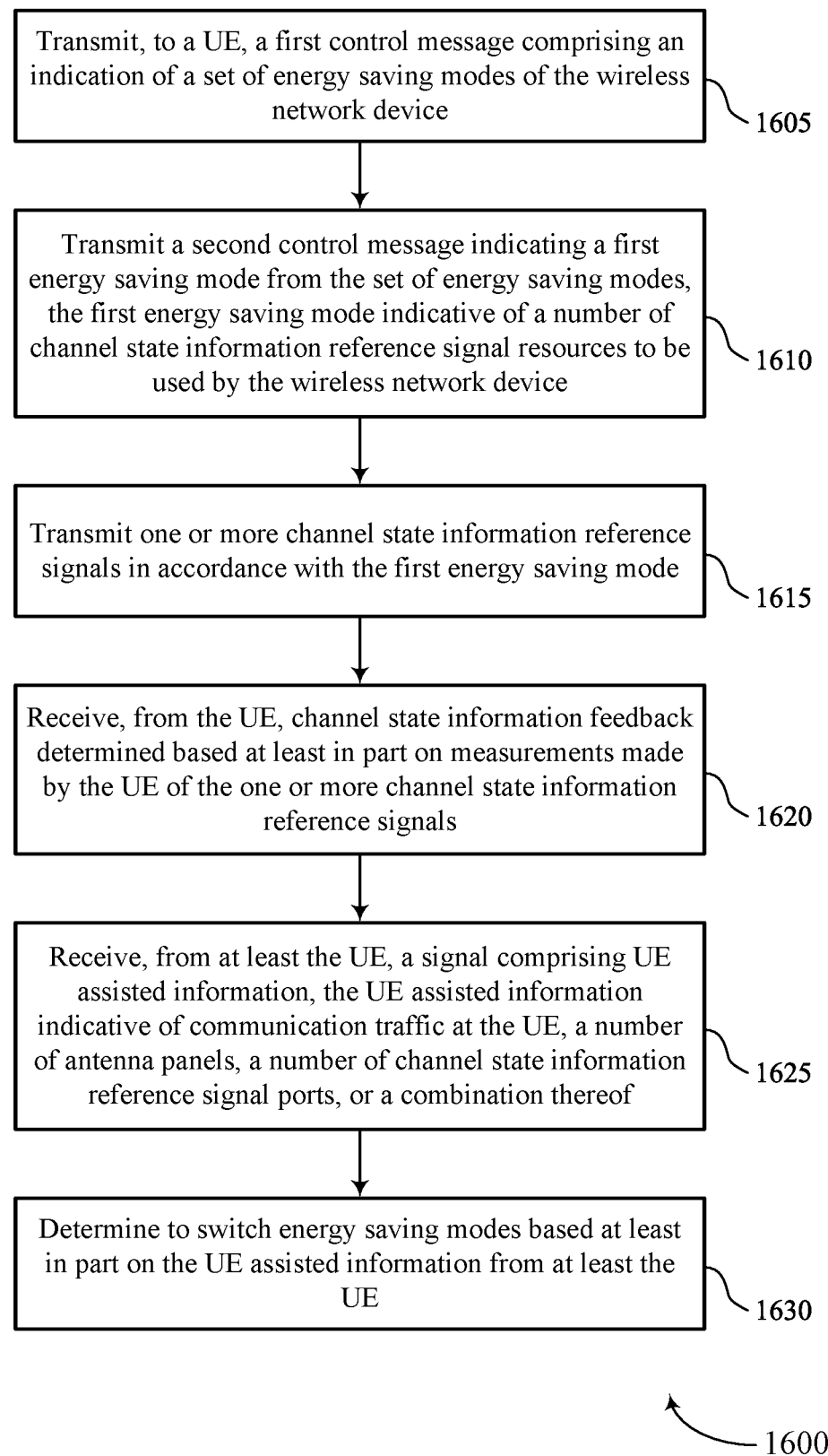

FIG. 16 shows a flowchart illustrating a method 1600 that supports techniques for configuring use of an energy saving mode in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a first control message including an indication of a set of energy saving modes of the wireless network device. The operations of 1605 may be performed in accordance with examples as disclosed herein. In some examples, aspects of the operations of 1605 may be performed by an energy mode set indication component 1125 as described with reference to FIG. 11.

At 1610, the method may include transmitting a second control message indicating a first energy saving mode from the set of energy saving modes, the first energy saving mode indicative of a number of channel state information reference signal resources to be used by the wireless network device. The operations of 1610 may be performed in accordance with examples as disclosed herein. In some examples, aspects of the operations of 1610 may be performed by an energy mode indication component 1130 as described with reference to FIG. 11.

At 1615, the method may include transmitting one or more channel state information reference signals in accordance with the first energy saving mode. The operations of 1615 may be performed in accordance with examples as disclosed herein. In some examples, aspects of the operations of 1615 may be performed by a reference signal transmission component 1135 as described with reference to FIG. 11.

At 1620, the method may include receiving, from the UE, channel state information feedback determined based on measurements made by the UE of the one or more channel state information reference signals. The operations of 1620 may be performed in accordance with examples as disclosed herein. In some examples, aspects of the operations of 1620 may be performed by a feedback reception component 1140 as described with reference to FIG. 11.

At 1625, the method may include receiving, from at least the UE, a signal including UE assisted information, the UE assisted information indicative of communication traffic at the UE, a number of antenna panels, a number of channel state information reference signal ports, or a combination thereof. The operations of 1625 may be performed in accordance with examples as disclosed herein. In some examples, aspects of the operations of 1625 may be performed by a UE information component 1145 as described with reference to FIG. 11.

At 1630, the method may include determining to switch energy saving modes based on the UE assisted information from at least the UE. The operations of 1630 may be performed in accordance with examples as disclosed herein. In some examples, aspects of the operations of 1630 may be performed by an energy mode switching component 1150 as described with reference to FIG. 11.

The following provides an overview of aspects of the present disclosure:

Aspect 1: A method for wireless communications at a UE, comprising: receiving, from a wireless network device, a first control message comprising an indication of a set of energy saving modes of the wireless network device; receiving a second control message indicating a first energy saving mode from the set of energy saving modes, the first energy saving mode indicative of a number of channel state information reference signal resources to be used by the wireless network device; monitoring one or more of the channel state information reference signal resources for a channel state information reference signal in accordance with the first energy saving mode; and transmitting, to the wireless network device, channel state information feedback determined based at least in part on measurements made by the UE of the channel state information reference signal.

Aspect 2: The method of aspect 1, further comprising: transmitting, to the wireless network device, a signal comprising UE assisted information, the UE assisted information indicative of communication traffic at the UE, a number of antenna panels, a number of channel state information reference signal ports, or a combination thereof, wherein the first energy saving mode is based at least in part on the UE assisted information.

Aspect 3: The method of any of aspects 1 through 2, wherein receiving the set of energy saving modes further comprises: receiving an indication of a number of channel state information reference signal ports allocated per channel state information reference signal resource associated with each energy saving mode of the set of energy saving modes.

Aspect 4: The method of aspect 3, further comprising: receiving a message identifying a set of channel state information reference signal ports that are activated during the first energy saving mode.

Aspect 5: The method of any of aspects 1 through 4, wherein receiving the set of energy saving modes further comprises: receiving an indication of a number of antenna panels of the wireless network device, a number of antenna sub-panels of the wireless network device, or both associated with each energy saving mode of the set of energy saving modes.

Aspect 6: The method of aspect 5, further comprising: receiving a message identifying a set of antenna panels, a set of antenna sub-panels, or both that are activated during the first energy saving mode.

Aspect 7: The method of aspect 6, wherein the message comprises an indication of a mapping of a set of channel state information reference signal ports corresponding with each antenna panel of the set of antenna panels, with each antenna sub-panel from the set of antenna sub-panels, or a combination thereof.

Aspect 8: The method of any of aspects 1 through 7, further comprising: monitoring, prior to receiving the second control message, a set of channel state information reference signal resources for the channel state information reference signal in accordance with a default energy saving mode; and transmitting, to the wireless network device, channel state information feedback determined based at least in part on measurements made by the UE of the channel state information reference signal in accordance with the default energy saving mode.

Aspect 9: The method of any of aspects 1 through 8, wherein receiving the first control message further comprises: receiving a radio resource control message comprising the indication of the set of energy saving modes of the wireless network device.

Aspect 10: The method of any of aspects 1 through 9, wherein the first control message indicates that the set of energy saving modes are applicable to uplink communications only, downlink communications only, or both.

Aspect 11: The method of any of aspects 1 through 10, wherein receiving the second control message further comprises: receiving a broadcasted message, a UE-specific message, or a group-common message indicating the first energy saving mode from the set of energy saving modes.

Aspect 12: The method of any of aspects 1 through 11, wherein receiving the second control message further comprises: receiving a radio resource control reconfiguration message indicating the first energy saving mode based at least in part on a duration between a previous energy saving mode and the first energy saving mode.

Aspect 13: The method of any of aspects 1 through 12, wherein the second control message indicating the first energy saving mode is received based at least in part on a synchronization signal block configuration.

Aspect 14: The method of any of aspects 1 through 13, wherein receiving the second control message further comprises: receiving a system information block, a medium access control (MAC) control element message, or downlink control information message, or a combination thereof indicating the first energy saving mode from the set of energy saving modes.

Aspect 15: The method of any of aspects 1 through 14, wherein the wireless network device is a base station, or a transmission reception point of the base station.

Aspect 16: A method for wireless communications at a wireless network device, comprising: transmitting, to a UE, a first control message comprising an indication of a set of energy saving modes of the wireless network device; transmitting a second control message indicating a first energy saving mode from the set of energy saving modes, the first energy saving mode indicative of a number of channel state information reference signal resources to be used by the wireless network device; transmitting one or more channel state information reference signals in accordance with the first energy saving mode; and receiving, from the UE, channel state information feedback determined based at least in part on measurements made by the UE of the one or more channel state information reference signals.

Aspect 17: The method of aspect 16, further comprising: receiving, from at least the UE, a signal comprising UE assisted information, the UE assisted information indicative of communication traffic at the UE, a number of antenna panels, a number of channel state information reference signal ports, or a combination thereof; and determining to switch energy saving modes based at least in part on the UE assisted information from at least the UE.

Aspect 18: The method of any of aspects 16 through 17, further comprising: deactivating one or more channel state information reference signals ports, one or more antenna panels, one or more antenna sub-panels, or a combination thereof based at least in part on the first energy saving mode.

Aspect 19: The method of any of aspects 16 through 18, wherein transmitting the set of energy saving modes further comprises: transmitting an indication of a number of channel state information reference signal ports allocated per channel state information reference signal resource associated with each energy saving mode of the set of energy saving modes.

Aspect 20: The method of aspect 19, further comprising: transmitting a message identifying a set of channel state information reference signal ports that are activated during the first energy saving mode.

Aspect 21: The method of any of aspects 19 through 20, wherein the channel state information reference signal ports are configured into one or more groups.

Aspect 22: The method of any of aspects 16 through 21, wherein transmitting the set of energy saving modes further comprises: transmitting an indication of a number of antenna panels, a number of antenna sub-panels, or both associated with each energy saving mode of the set of energy saving modes.

Aspect 23: The method of aspect 22, further comprising: transmitting a message identifying a set of antenna panels, a set of antenna sub-panels, or both that are activated during the first energy saving mode.

Aspect 24: The method of aspect 23, wherein the message comprises an indication of a mapping of a set of channel state information reference signal ports corresponding with each antenna panel of the set of antenna panels, with each antenna sub-panel from the set of antenna sub-panels, or a combination thereof.

Aspect 25: The method of any of aspects 16 through 24, further comprising: transmitting, one or more channel state information references signals via a set of resources in accordance with a default energy saving mode; and receiving, from the UE, channel state information feedback determined based at least in part on measurements made by the UE of the one or more channel state information reference signals in accordance with the default energy saving mode.

Aspect 26: The method of aspect 25, further comprising: determining to switch to the first energy saving mode from the default energy saving mode, where transmitting the second control message is based at least in part on the determination.

Aspect 27: The method of any of aspects 16 through 26, wherein transmitting the first control message further comprises: transmitting a radio resource control message comprising the indication of the set of energy saving modes of the wireless network device.

Aspect 28: The method of any of aspects 16 through 27, wherein the first control message indicates that the set of energy saving modes are applicable to uplink communications, downlink communications, or both.

Aspect 29: The method of any of aspects 16 through 28, wherein transmitting the second control message further comprises: transmitting a broadcasted message, a UE-specific message, or a group-common message indicating the first energy saving mode from the set of energy saving modes.

Aspect 30: The method of any of aspects 16 through 29, wherein transmitting the second control message further comprises: transmitting a radio resource control reconfiguration message indicating the first energy saving mode based at least in part on a duration between a previous energy saving mode and the first energy saving mode.

Aspect 31: The method of any of aspects 16 through 30, wherein the second control message indicating the first energy saving mode is received based at least in part on a synchronization signal block configuration.

Aspect 32: The method of any of aspects 16 through 31, wherein transmitting the second control message further comprises: transmitting a system information block, a medium access control (MAC) control element message, or downlink control information message, or a combination thereof indicating the first energy saving mode from the set of energy saving modes.

Aspect 33: The method of any of aspects 16 through 32, wherein the wireless network device is a base station, or a transmission reception point of the base station.

Aspect 34: An apparatus for wireless communications, comprising a processor; memory coupled with the processor; and instructions stored in the memory and executable by the processor to cause the apparatus to perform a method of any of aspects 1 through 15.

Aspect 35: An apparatus for wireless communications, comprising at least one means for performing a method of any of aspects 1 through 15.

Aspect 36: A non-transitory computer-readable medium storing code for wireless communications, the code comprising instructions executable by a processor to perform a method of any of aspects 1 through 15.

Aspect 37: An apparatus for wireless communications, comprising a processor; memory coupled with the processor; and instructions stored in the memory and executable by the processor to cause the apparatus to perform a method of any of aspects 16 through 33.

Aspect 38: An apparatus for wireless communications, comprising at least one means for performing a method of any of aspects 16 through 33.

Aspect 39: A non-transitory computer-readable medium storing code for wireless communications, the code comprising instructions executable by a processor to perform a method of any of aspects 16 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a wireless network device, a first control message comprising an indication of a set of energy saving configurations of the wireless network device and an indication of a number of channel state information reference signal ports allocated per channel state information reference signal resource associated with each energy saving configuration of the set of energy saving configurations;
   receiving a second control message indicating a first energy saving configuration from the set of energy saving configurations, the first energy saving configuration indicative of a number of channel state information reference signal resources to be used by the wireless network device;
   monitoring one or more of the channel state information reference signal resources for a channel state information reference signal in accordance with the first energy saving configuration; and
   transmitting, to the wireless network device, channel state information feedback determined based at least in part on measurements made by the UE of the channel state information reference signal.

2. The method of claim 1, further comprising:
   receiving a message identifying a set of channel state information reference signal ports that are activated during the first energy saving configuration.

3. The method of claim 1, wherein receiving the set of energy saving configurations further comprises:
   receiving an indication of a number of antenna panels of the wireless network device, a number of antenna sub-panels of the wireless network device, or both associated with each energy saving configuration of the set of energy saving configurations.

4. The method of claim 3, further comprising:
   receiving a message identifying a set of antenna panels, a set of antenna sub-panels, or both that are activated during the first energy saving configuration.

5. The method of claim 4, wherein the message comprises an indication of a mapping of a set of channel state information reference signal ports corresponding with each antenna panel of the set of antenna panels, with each antenna sub-panel from the set of antenna sub-panels, or a combination thereof.

6. The method of claim 1, wherein receiving the second control message further comprises:
   receiving a broadcasted message, a UE-specific message, or a group-common message indicating the first energy saving configuration from the set of energy saving configurations.

7. The method of claim 1, wherein receiving the second control message further comprises:
   receiving a radio resource control reconfiguration message indicating the first energy saving configuration based at least in part on a duration between a previous energy saving configuration and the first energy saving configuration.

8. The method of claim 1, wherein the second control message indicating the first energy saving configuration is received based at least in part on a synchronization signal block configuration.

9. The method of claim 1, wherein the wireless network device is a base station, or a transmission reception point of the base station.

10. A method for wireless communications at a wireless network device, comprising:
- transmitting, to a user equipment (UE), a first control message comprising an indication of a set of energy saving configurations of the wireless network device and an indication of a number of channel state information reference signal ports allocated per channel state information reference signal resource associated with each energy saving configuration of the set of energy saving configurations;
- transmitting a second control message indicating a first energy saving configuration from the set of energy saving configurations, the first energy saving configuration indicative of a number of channel state information reference signal resources to be used by the wireless network device;
- transmitting one or more channel state information reference signals in accordance with the first energy saving configuration; and
- receiving, from the UE, channel state information feedback determined based at least in part on measurements made by the UE of the one or more channel state information reference signals.

11. The method of claim 10, further comprising:
- transmitting a message identifying a set of channel state information reference signal ports that are activated during the first energy saving configuration.

12. The method of claim 10, wherein the channel state information reference signal ports are configured into one or more groups.

13. The method of claim 10, wherein transmitting the set of energy saving configurations further comprises:
- transmitting an indication of a number of antenna panels, a number of antenna sub-panels, or both associated with each energy saving configuration of the set of energy saving configurations.

14. The method of claim 13, further comprising:
- transmitting a message identifying a set of antenna panels, a set of antenna sub-panels, or both that are activated during the first energy saving configuration.

15. The method of claim 14, wherein the message comprises an indication of a mapping of a set of channel state information reference signal ports corresponding with each antenna panel of the set of antenna panels, with each antenna sub-panel from the set of antenna sub-panels, or a combination thereof.

16. The method of claim 10, further comprising:
- transmitting, one or more channel state information references signals via a set of resources in accordance with a default energy saving configuration; and
- receiving, from the UE, channel state information feedback determined based at least in part on measurements made by the UE of the one or more channel state information reference signals in accordance with the default energy saving configuration.

17. The method of claim 16, further comprising:
- determining to switch to the first energy saving configuration from the default energy saving configuration, where transmitting the second control message is based at least in part on the determination.

18. The method of claim 10, wherein the first control message indicates that the set of energy saving configurations are applicable to uplink communications, downlink communications, or both.

19. The method of claim 10, wherein transmitting the second control message further comprises:
- transmitting a radio resource control reconfiguration message indicating the first energy saving configuration based at least in part on a duration between a previous energy saving configuration and the first energy saving configuration.

20. The method of claim 10, wherein the second control message indicating the first energy saving configuration is received based at least in part on a synchronization signal block configuration.

21. An apparatus for wireless communications, comprising:
- a processor;
- memory coupled with the processor; and
- instructions stored in the memory and executable by the processor to cause the apparatus to:
  - receive, from a wireless network device, a first control message comprising an indication of a set of energy saving configurations of the wireless network device and an indication of a number of channel state information reference signal ports allocated per channel state information reference signal resource associated with each energy saving configuration of the set of energy saving configurations;
  - receive a second control message indicating a first energy saving configuration from the set of energy saving configurations, the first energy saving configuration indicative of a number of channel state information reference signal resources to be used by the wireless network device;
  - monitor one or more of the channel state information reference signal resources for a channel state information reference signal in accordance with the first energy saving configuration; and
  - transmit, to the wireless network device, channel state information feedback determined based at least in part on measurements made by the apparatus of the channel state information reference signal.

22. The apparatus of claim 21, wherein the instructions are further executable by the processor to cause the apparatus to:
- transmit, to the wireless network device, a signal comprising UE assisted information, the UE assisted information indicative of communication traffic at the apparatus, a number of antenna panels, or a combination thereof, wherein the first energy saving configuration is based at least in part on the UE assisted information.

23. The apparatus of claim 21, wherein the instructions are further executable by the processor to cause the apparatus to:
- monitor, prior to receiving the second control message, a set of channel state information reference signal resources for the channel state information reference signal in accordance with a default energy saving configuration; and
- transmit, to the wireless network device, channel state information feedback determined based at least in part on measurements made by the apparatus of the channel state information reference signal in accordance with the default energy saving configuration.

24. The apparatus of claim 21, wherein the instructions to receive the first control message are further executable by the processor to cause the apparatus to:
- receive a radio resource control message comprising the indication of the set of energy saving configurations of the wireless network device.

25. An apparatus for wireless communications, comprising:
- a processor;
- memory coupled with the processor; and
- instructions stored in the memory and executable by the processor to cause the apparatus to:
  - transmit, to a user equipment (UE), a first control message comprising an indication of a set of energy saving configurations of the apparatus and an indication of a number of channel state information reference signal ports allocated per channel state information reference signal resource associated with each energy saving configuration of the set of energy saving configurations;
  - transmit a second control message indicating a first energy saving configuration from the set of energy saving configurations, the first energy saving configuration indicative of a number of channel state information reference signal resources to be used by the apparatus;
  - transmit one or more channel state information reference signals in accordance with the first energy saving configuration; and
  - receive, from the UE, channel state information feedback determined based at least in part on measurements made by the UE of the one or more channel state information reference signals.

26. The apparatus of claim 25, wherein the instructions are further executable by the processor to cause the apparatus to:
- receive, from at least the UE, a signal comprising UE assisted information, the UE assisted information indicative of communication traffic at the UE, a number of antenna panels, or a combination thereof; and
- determine to switch energy saving configurations based at least in part on the UE assisted information from at least the UE.

27. The apparatus of claim 25, wherein the instructions are further executable by the processor to cause the apparatus to:
- deactivate one or more channel state information reference signals ports, one or more antenna panels, one or more antenna sub-panels, or a combination thereof based at least in part on the first energy saving configuration.

28. The apparatus of claim 25, wherein the instructions to transmit the second control message are further executable by the processor to cause the apparatus to:
- transmit a broadcasted message, a UE-specific message, or a group-common message indicating the first energy saving configuration from the set of energy saving configurations.

* * * * *